(12) United States Patent
Ogura et al.

(10) Patent No.: US 11,516,021 B2
(45) Date of Patent: Nov. 29, 2022

(54) INFORMATION PROCESSING APPARATUS, COMMUNICATION DEVICE, AND INFORMATION PROCESSING SYSTEM

(71) Applicant: KABUSHIKI KAISHA TOSHIBA, Minato-ku (JP)

(72) Inventors: Naoki Ogura, Yokohama (JP); Yoshikazu Hanatani, Komae (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 365 days.

(21) Appl. No.: 16/284,429

(22) Filed: Feb. 25, 2019

(65) Prior Publication Data
US 2020/0076620 A1  Mar. 5, 2020

(30) Foreign Application Priority Data

Aug. 30, 2018 (JP) .............................. JP2018-162011

(51) Int. Cl.
*H04L 9/32* (2006.01)
*H04L 9/30* (2006.01)

(52) U.S. Cl.
CPC .............. *H04L 9/3268* (2013.01); *H04L 9/30* (2013.01)

(58) Field of Classification Search
CPC ....... H04L 9/3268; H04L 9/30; H04L 9/3247; H04L 9/007
(Continued)

(56) References Cited

U.S. PATENT DOCUMENTS 7,020,778 B1 * 3/2006 Miettinen ............. H04L 9/3247
379/93.02
7,249,102 B1 * 7/2007 Terada ................ G06Q 20/1235
705/51
(Continued)

FOREIGN PATENT DOCUMENTS

JP 2001057552 A * 2/2001
JP 2001265216    * 9/2001
(Continued)

OTHER PUBLICATIONS

D. Cooper et al., RFC5280, "Internet X. 509 Public Key Infrastructure Certificate and Certificate Revocation List (CRL) Profile",[online], May 2008, Internet Engineering Task Force, [searched on Jul. 11, 2018], Internet <URL:http://www.rfc-editor.org/rfc/pdfrfc/rfc5280.txt.pdf> 151 pages.

(Continued)

*Primary Examiner* — Shahriar Zarrineh
(74) *Attorney, Agent, or Firm* — Oblon, McClelland, Maier & Neustadt, L.L.P.

(57) ABSTRACT

According to one embodiment, an information processing apparatus includes one or more processors. The processors store a first public key certificate and second public key certificates in storage. The first public key certificate includes a first validity period, a signature, and a public key. Each of the second public key certificates including a signature and a second validity period that is within the first validity period and shorter than the first validity period. The second validity periods included in the second public key certificates are mutually different. The processors receive specific information of the first public key certificate. The processors transmit one of the plurality of second public key certificate including the second validity period in which a start time of the second validity period is before a current time and generated from the first public key certificate (Continued)

specified by the received specific information to a transmission source of the specific information.

8 Claims, 15 Drawing Sheets

(58) Field of Classification Search
USPC .......................................................... 713/158
See application file for complete search history.

(56) References Cited

U.S. PATENT DOCUMENTS

| | | | | |
|---|---|---|---|---|
| 7,340,600 | B1* | 3/2008 | Corella | H04L 63/0823 |
| | | | | 713/155 |
| 7,843,750 | B2* | 11/2010 | Park | H01L 27/10876 |
| | | | | 365/203 |
| 8,499,147 | B2* | 7/2013 | Ikeda | G06F 21/32 |
| | | | | 713/155 |
| 8,924,717 | B2* | 12/2014 | Sugano | H04L 9/0891 |
| | | | | 713/158 |
| 9,479,340 | B1* | 10/2016 | Miller | G06F 21/575 |
| 2001/0032310 | A1* | 10/2001 | Corella | H04L 9/006 |
| | | | | 713/156 |
| 2002/0099822 | A1* | 7/2002 | Rubin | H04L 9/3268 |
| | | | | 709/225 |
| 2005/0204164 | A1* | 9/2005 | Kakii | H04L 9/3268 |
| | | | | 726/5 |
| 2005/0210241 | A1* | 9/2005 | Lee | H04L 63/0823 |
| | | | | 713/158 |
| 2006/0047951 | A1* | 3/2006 | Reilly | H04L 9/3263 |
| | | | | 713/158 |
| 2007/0016783 | A1* | 1/2007 | Saito | H04L 9/3247 |
| | | | | 713/175 |
| 2007/0061576 | A1* | 3/2007 | Takada | H04L 63/0823 |
| | | | | 713/175 |
| 2007/0074036 | A1* | 3/2007 | Ramzan | H04L 9/3268 |
| | | | | 713/176 |
| 2007/0223706 | A1* | 9/2007 | Gantman | H04L 9/085 |
| | | | | 380/286 |
| 2008/0010451 | A1* | 1/2008 | Holtzman | H04L 9/3263 |
| | | | | 713/158 |
| 2008/0082831 | A1* | 4/2008 | Fujimaki | H04L 9/3297 |
| | | | | 713/178 |
| 2008/0260156 | A1* | 10/2008 | Baba | G06F 21/34 |
| | | | | 726/2 |
| 2008/0313740 | A1* | 12/2008 | Watanabe | H04L 9/3297 |
| | | | | 726/26 |
| 2009/0228703 | A1* | 9/2009 | Grajek | H04L 9/3268 |
| | | | | 713/156 |
| 2010/0040234 | A1* | 2/2010 | Alrabady | H04L 9/321 |
| | | | | 380/278 |
| 2010/0268942 | A1* | 10/2010 | Hernandez-Ardieta | |
| | | | | H04L 9/006 |
| | | | | 713/156 |
| 2011/0231662 | A1* | 9/2011 | Sato | H04L 9/0891 |
| | | | | 713/176 |
| 2012/0198240 | A1* | 8/2012 | Tie | H04L 9/3213 |
| | | | | 713/176 |
| 2012/0210123 | A1* | 8/2012 | Castelnuovo | H04L 63/0823 |
| | | | | 713/156 |
| 2013/0054963 | A1* | 2/2013 | Lee | H04L 63/12 |
| | | | | 713/158 |
| 2013/0145155 | A1* | 6/2013 | Liu | H04L 9/3263 |
| | | | | 713/156 |
| 2013/0254535 | A1* | 9/2013 | Akehurst | H04L 63/0435 |
| | | | | 713/158 |
| 2013/0275750 | A1* | 10/2013 | Grajek | H04L 63/0823 |
| | | | | 713/156 |
| 2013/0318354 | A1* | 11/2013 | Entschew | H04L 9/3247 |
| | | | | 713/175 |
| 2014/0075185 | A1* | 3/2014 | Dragomir | G06F 21/33 |
| | | | | 713/156 |
| 2015/0271208 | A1* | 9/2015 | Gallant | H04L 9/3247 |
| | | | | 726/1 |
| 2015/0318997 | A1* | 11/2015 | Kobayashi | H04L 63/0823 |
| | | | | 713/156 |
| 2016/0149890 | A1* | 5/2016 | Ujiie | H04L 63/101 |
| | | | | 726/3 |
| 2016/0173287 | A1* | 6/2016 | Bowen | H04L 9/3268 |
| | | | | 713/156 |
| 2016/0365985 | A1* | 12/2016 | Pilcher | H04L 9/3268 |
| 2017/0093570 | A1* | 3/2017 | Maruyama | H04L 63/045 |
| 2017/0279618 | A1* | 9/2017 | Kent | H04L 9/006 |
| 2017/0288880 | A1* | 10/2017 | Brockhaus | H04L 9/3247 |
| 2017/0324567 | A1* | 11/2017 | Matsuo | H04L 9/0861 |
| 2017/0338966 | A1* | 11/2017 | Li | H04L 63/0823 |
| 2019/0007217 | A1* | 1/2019 | Takemori | G06F 21/64 |
| 2019/0052456 | A1* | 2/2019 | Bygrave | H04L 9/3234 |
| 2019/0238344 | A1* | 8/2019 | Kaga | G06F 21/32 |
| 2019/0260595 | A1* | 8/2019 | Walton | H04L 9/3268 |
| 2019/0379548 | A1* | 12/2019 | Barrett | H04W 4/40 |
| 2019/0394053 | A1* | 12/2019 | Yu | H04L 63/062 |

FOREIGN PATENT DOCUMENTS

| | | | | |
|---|---|---|---|---|
| JP | 2003-264538 A | | 9/2003 | |
| JP | 2005204144 | * | 7/2005 | |
| JP | 2006-270646 A | | 10/2006 | |
| JP | 2007-28049 A | | 2/2007 | |
| JP | 4033601 B2 | * | 1/2008 | |
| JP | 2010-81154 A | | 4/2010 | |
| JP | 4631132 B2 | * | 2/2011 | |
| JP | 6219976 | | 10/2017 | |
| JP | 2017-537548 A | | 12/2017 | |
| JP | 2020036228 A | * | 3/2020 | ............ H04L 9/007 |
| KR | 20040104723 A | * | 12/2004 | |
| KR | 20040104723 A | * | 12/2004 | |
| WO | WO-2012011254 | * | 1/2012 | |
| WO | WO 2015/111107 A1 | | 7/2015 | |

OTHER PUBLICATIONS

S. Santesson et al., RFC6960, "X. 509 Internet Public Key Infrastructure Online Certificate Status Protocol—OCSP", [online], Jun. 2013. Internet Engineering Task Force. [searched on Jul. 11, 2018], Internet <URL:http://www.rfc-editor.org/rfc/pdfrfc/rfc6960.txt.pdf> 41 pages.

E. Topalovic et al., "Towards Short-Lived Certificates", 2012, IEEE Oakland Web 2.0 Security and Privacy. 9 pages.

Y. Sheffer et al. "Support for Short-Term, Automatically-Renewed (STAR) Certificates in Automated Certificate Management Environment (ACME)", [online] Oct. 2018, [searched on Feb. 6, 2019], Internet <URL:https://datatracker.ietf.org/doc/draft-ietf-acme-star/?include_text=1.draft-ietf-acme-star-03> 22 pages.

* cited by examiner 12, 14, 16, 18

INFORMATION PROCESSING APPARATUS, COMMUNICATION DEVICE, AND INFORMATION PROCESSING SYSTEM

CROSS-REFERENCE TO RELATED APPLICATIONS

This application is based upon and claims the benefit of priority from Japanese Patent Application No. 2018-162011, filed on Aug. 30, 2018; the entire contents of which are incorporated herein by reference.

FIELD

Embodiments described herein relate generally to an information processing apparatus, a communication device, and an information processing system.

BACKGROUND

A system that connects devices such as household appliances or smart meters installed at homes to a Home Area Network (HAN) and realizes communication between devices and communication between devices and apparatuses outside the HAN is under review. In such a system, an authentication technique based on a public key infrastructure (PKI) is used as a technique for authenticating validity of devices. In PKI-based authentication, a public key certificate issued from a certification authority (CA) is used.

Here, there are cases in which the public key certificate is revoked. In this regard, a system in which, when a public key certificate is revoked, a certificate authority delivers a certificate revocation list (CRL) that is a list of revoked public key certificates to an authentication entity is disclosed. However, as information included in the CRL increases, a processing load on the authentication entity increases. In this regard, a method in which an authentication entity transmits information related to a public key certificate of a validity confirmation target to a certificate authority, and receives a response of a valid state from the certificate authority is disclosed. However, in the related art, it is necessary for the certificate authority to assign a digital signature or transmit a response of a valid state each time there is a request from the authentication entity, and thus the load on the certificate authority increases. Therefore, in the related art, a burden on entities that use the public key certificate such as the certificate authority and the authentication entity is large.

DETAILED DESCRIPTION

According to one embodiment, an information processing apparatus includes one or more processors. The processors store a first public key certificate and second public key certificates in storage. The first public key certificate includes a first validity period, a signature, and a public key. Each of the second public key certificates including a signature and a second validity period that is within the first validity period and shorter than the first validity period. The second validity periods included in the second public key certificates are mutually different. The processors receive specific information of the first public key certificate. The processors transmit one of the plurality of second public key certificate including the second validity period in which a start time of the second validity period is before a current time and generated from the first public key certificate specified by the received specific information to a transmission source of the specific information.

An information processing apparatus, a communication device, and an information processing system will be described in detail below with reference to the appended drawings.

Figure 1:
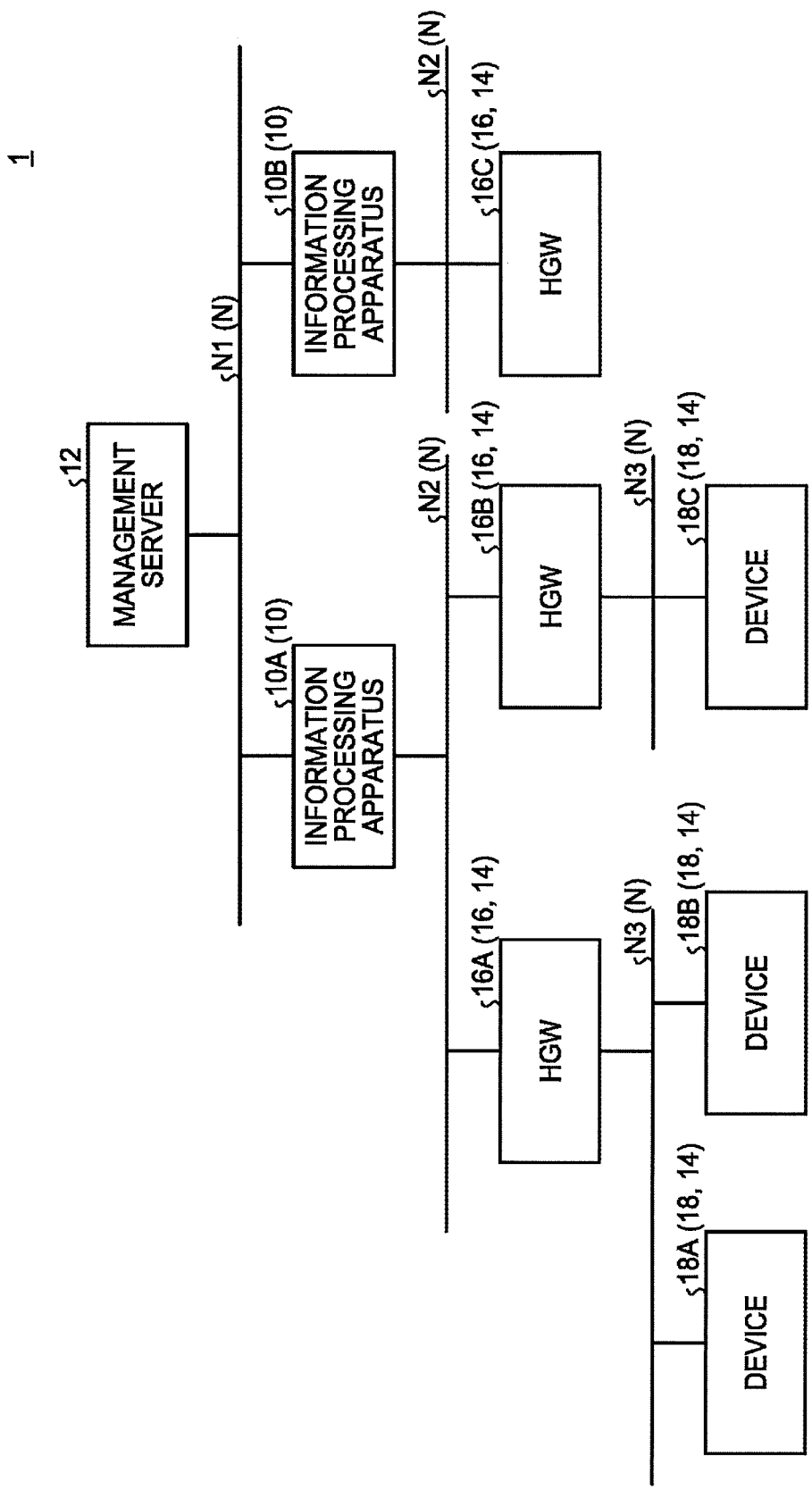
FIG. 1 is a schematic diagram of an information processing system.

FIG. 1 is a schematic diagram illustrating an example of an information processing system 1 of the present embodiment.

The information processing system 1 includes a management server 12, an information processing apparatus 10, and a communication device 14. The communication device 14 includes a home gateway (HGW) 16 and a device 18. The management server 12, the information processing apparatus 10, and the communication device 14 (the HGW 16 and the device 18) are connected so that data or signals can be exchanged via a network N.

In the present embodiment, an example in which the information processing system 1 includes a plurality of information processing apparatuses 10 (an information processing apparatus 10A and an information processing apparatus 10B), a plurality of HGW 16 (an HGW 16A, an HGW 16B, and an HGW 16C), and a plurality of devices 18 (a devices 18A, a device 18B, and a device 18C) will be described. In the information processing system 1, the number of management servers 12 may be one or more, the number of information processing apparatuses 10 may be one or more, the number of HGWs 16 may be one or more, and the number of devices 18 may be one or more, and the number of respective apparatuses is not limited.

Further, in the present embodiment, an example in which the communication devices 14 (the HGW 16 and the device 18) are installed in a predetermined region such as home and communicate with the information processing apparatus 10 and the management server 12 installed outside the region is assumed.

The management server 12 and the information processing apparatus 10 are connected via a first network N1. The first network N1 is an example of a network N. The first network N1 is, for example, the Internet, an inter-company dedicated line, or the like. It is desirable that the management server 12 and the information processing apparatus 10 be connected to be able to exchange data or signals. Therefore, the management server 12 and the information processing apparatus 10 may exchange data or signals via a physical medium such as a floppy disk (FD), a CD-ROM, a CD-R, a DVD, or the like.

The information processing apparatus 10 and the HGW 16 are connected via a second network N2. The second network N2 is an example of a network N. The second network N2 is, for example, the Internet, a local area network (LAN), an intranet, and the like. The second network N2 may be a combination of a plurality of communication means. For example, a router (for example, a broadband router) for connecting to the Internet is installed between the information processing apparatus 10 and the HGW 16. Then, the information processing apparatus 10 and the router are communicably connected via the Internet. Further, the router and the HGW 16 may be connected via a LAN.

The HGW 16 and the device 18 are connected via a home network N3. The home network N3 is a home area network (HAN), and is a network N installed in a certain region such as home. The home network N3 is, for example, a LAN, an intranet, a personal area network (PAN) constituted by a Bluetooth (registered trademark) or the like, a multihop network using a 920 MHz band or the like, or the like. The home network N3 may be a combination of a plurality of types of communication means. A plurality of devices 18 may be further connected to the home network N3.

The management server 12 corresponds to a certificate authority that issues a public key certificate in an authentication technique based on a public key infrastructure (PKI). In the present embodiment, the management server 12 performs issuance, generation, and the like of the public key certificate (which will be described in detail later).

The information processing apparatus 10 delivers the public key certificate issued and generated by the management server 12 to the communication device 14 (which will be described in detail later).

The communication device 14 is an example of an authentication entity that performs authentication using the public key certificate issued/generated by the management server 12. As described above, the communication device 14 includes the HGW 16 and the device 18. In the present embodiment, when the HGW 16 and the device 18 are collectively described, they are referred to collectively as a communication device 14.

The HGW 16 manages communication of the device 18 connected to the home network N3. For example, the HGW 16 determines whether or not communication of the home network N3 of the device 18 is permitted. Further, for example, the HGW 16 generates a shared key for protecting communication between the HGW 16 and the device 18 and shares the shared key with the device 18. Further, for example, the HGW 16 transmits the public key certificate received from the device 18 to the other devices 18 connected to the same home network N3. Further, for example, the HGW 16 transmits a control command for the device 18 or a request command for various types of information to the device 18.

The device 18 is an electronic device connected to the home network N3. Examples of the device 18 include a household appliance, a measuring device such as a smart meter, and an audio visual (AV) device. The device 18 may have a function of controlling the other devices 18. Further, the device 18 may have a function of acquiring various types of information from other devices.

In the information processing system 1 of the present embodiment, the communication devices 14 (the HGW 16 and the device 18) perform communication using an authentication technique based on the public key infrastructure (PKI).

Figure 2:
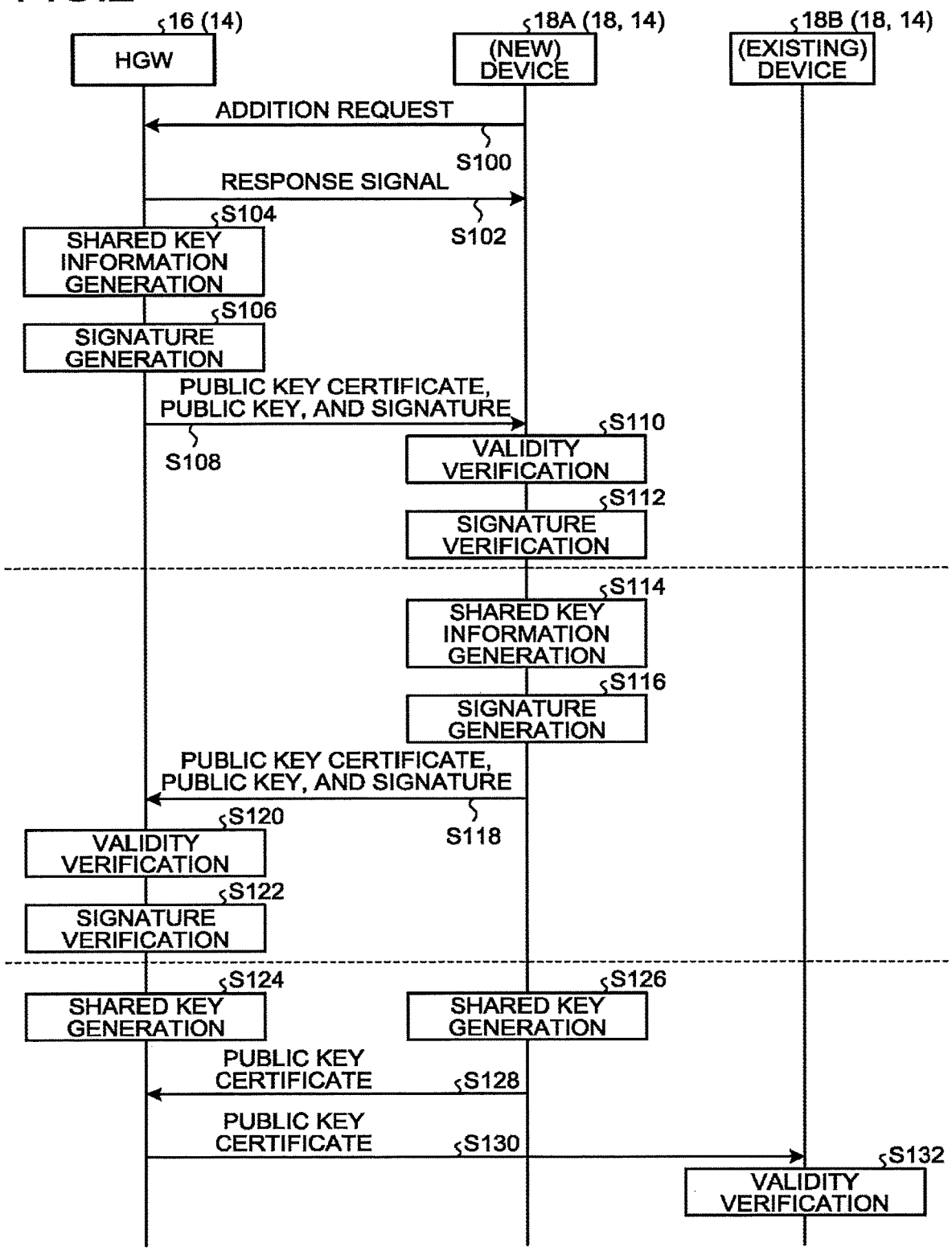
FIG. 2 is a sequence diagram of a communication procedure using a public key certificate.

FIG. 2 is a sequence diagram illustrating an example of a communication procedure using the public key certificate between the HGW 16 and the device 18. FIG. 2 illustrates a procedure in a case in which the device 18A is connected to the home network N3 as a new device 18, and the validity of the public key certificate of the device 18A is verified by the device 18B that is another device 18 already connected to the home network N3.

The device 18A transmits a signal indicating an addition request to the home network N3 to the HGW 16 (Step S100). The HGW 16 transmits a response signal indicating a start of an addition process to the device 18A (Step S102).

The HGW 16 generates shared key information (Step S104). The shared key information is information used for generating a shared key used for communication protection between the HGW 16 and the device 18A. The shared key information includes a private key of the shared key information and a public key corresponding to the private key. Only the HGW 16 holds the private key and the public key.

The HGW 16 acquires the public key certificate used for authentication of the HGW 16 from the information processing apparatus 10. The information processing apparatus 10 transmits the public key certificate in which the HGW 16 is regarded as the authentication target to the HGW 16. The HGW 16 receives the public key certificate from the information processing apparatus 10. The public key certificate is used when the newly connected device 18A authenticates communication with the HGW 16.

The HGW 16 generates a signature for data including the public key of the shared key information using the private key corresponding to the public key included in the public key certificate (Step S106). The signature is also referred to as an electronic signature or a digital signature.

Then, the HGW 16 transmits the public key certificate, acquired from the management server 12, in which the HGW 16 is regarded as the authentication target, the public key included in the shared key information generated in Step S104, and the signature generated in Step S106 to the device 18A (Step S108).

The device 18A verifies the validity of the public key certificate received in Step S108 (Step S110). Further, the device 18A verifies the signature received in Step S108 using the public key included in the public key certificate received in Step S108 (Step S112). Here, the description will be continued under the assumption that a verification result of Step S110 and Step S112 indicates successful verification.

Then, the device 18A generates new shared key information (Step S114). This shared key information is information used for generating a shared key used for communication protection between the HGW 16 and the device 18A. The shared key information includes a private key of the shared key information and a public key corresponding to the private key. Only the device 18A holds the private key and the public key.

The device 18A acquires the public key certificate used for authentication of the device 18A from the information processing apparatus 10. The information processing apparatus 10 transmits the public key certificate in which the device 18A is regarded as the authentication target to the device 18A. The device 18A receives the public key certificate from the information processing apparatus 10. The public key certificate is used when the HGW 16 authenticates communication with the newly connected device 18A.

The device 18A generates a signature for data including the public key of the shared key information using the private key corresponding to the public key included in the public key certificate (Step S116). The signature is also referred to as an electronic signature or a digital signature.

Then, the device 18A transmits the public key certificate, acquired from the management server 12, in which the device 18A is regarded as the authentication target, the public key included in the shared key information generated in Step S114, and the signature generated in Step S116 to the HGW 16 (Step S118).

The HGW 16 verifies the validity of the public key certificate received in Step S118 (Step S120). Further, the HGW 16 verifies the signature received in Step S118 using the public key included in the public key certificate received in Step S118 (Step S122). Here, the description will be continued under the assumption that verification results of Step S120 and Step S112 indicate successful verification.

If the verification in Step S120 and Step S122 is successful, the HGW 16 permits communication of the device 18A using the home network N3. If the communication of the device 18A using the home network N3 is permitted, the HGW 16 generates a shared key used for communication protection with the device 18A using the private key included in the shared key information generated in Step S104 and the public key received in Step S118 (Step S124). Thereafter, communication of the HGW 16 with the device 18A is protected by using the shared key.

On the other hand, if the verification in Step S114 and Step S116 is successful, the device 18A determines that communication to the HGW 16 via the home network N3 is possible. Then, the device 18A generates a shared key used for communication protection with the HGW 16 using the private key included in the shared key information generated in Step S114 and the public key received in Step S108 (Step S126). Thereafter, communication of the device 18A with the HGW 16 is protected by using the shared key.

Then, the device 18A transmits the public key certificate used for authentication of the device 18A to the HGW 16 (Step S128). The HGW 16 transmits information of the public key certificate to the information processing apparatus 10. Then, the HGW 16 acquires the public key certificate in which the device 18A is regarded as the authentication target from the information processing apparatus 10 and transmits the public key certificate to the device 18B (Step S130). The device 18A may transmit the public key certificate transmitted to the HGW 16 in Step S118 to the HGW 16 in Step S128. In this case, the HGW 16 may transmit the public key certificate received in Step S128 to the device 18B as the public key certificate in which the device 18A is regarded as the authentication target.

The other device 18 connected to the home network N3, device 18B, verifies the validity of the public key certificate received in Step S130 (Step S132). When the validity verification is successful, the device 18B and the device 18A can communicate via the HGW 16. On the other hand, if the validity verification fails, the device 18B discards the public key certificate received in Step S130.

As described above, when communication using the public key certificate is performed between the HGW 16 and the device 18, it is necessary for each of the HGW 16 and the device 18 to verify the validity of the received public key certificate.

In the related art, the certificate revocation list (CRL) delivered from the management server 12 is used at the time of validity verification. The CRL is a list in which identification information of the revoked public key certificates and the like are recorded. A capacity of the CRL becomes a huge capacity depending on the scale of the network N, the passage of time, or the like. Therefore, in the related art, it is necessary for the communication device 14 side such as the HGW 16 and the device 18 to analyze the CRL having the large data capacity each time the validity verification is performed. Therefore, in the related art, the load of the communication device 14 that is the authentication entity authenticating the public key certificate is large. Further, in the related art, it is necessary for the management server 12 to assign the signature of the management server 12 each time it is requested from the HGW 16 or the device 18, and the load increases. In other words, in the related art, the load on a use entity of the public key certificate such as the communication device 14 or the management server 12 is large. The use entity refers to an entity using the public key certificate. In the present embodiment, the use entity indicates the communication device 14 (the HGW 16 and the device 18) and the management server 12.

In this regard, the information processing system 1 of the present embodiment uses a public key certificate (a second public key certificate) generated by updating a public key certificate (first public key certificate) issued for each of the communication devices 14 of the authentication target for authentication of the authentication target. Details will be described below.

Figure 3:
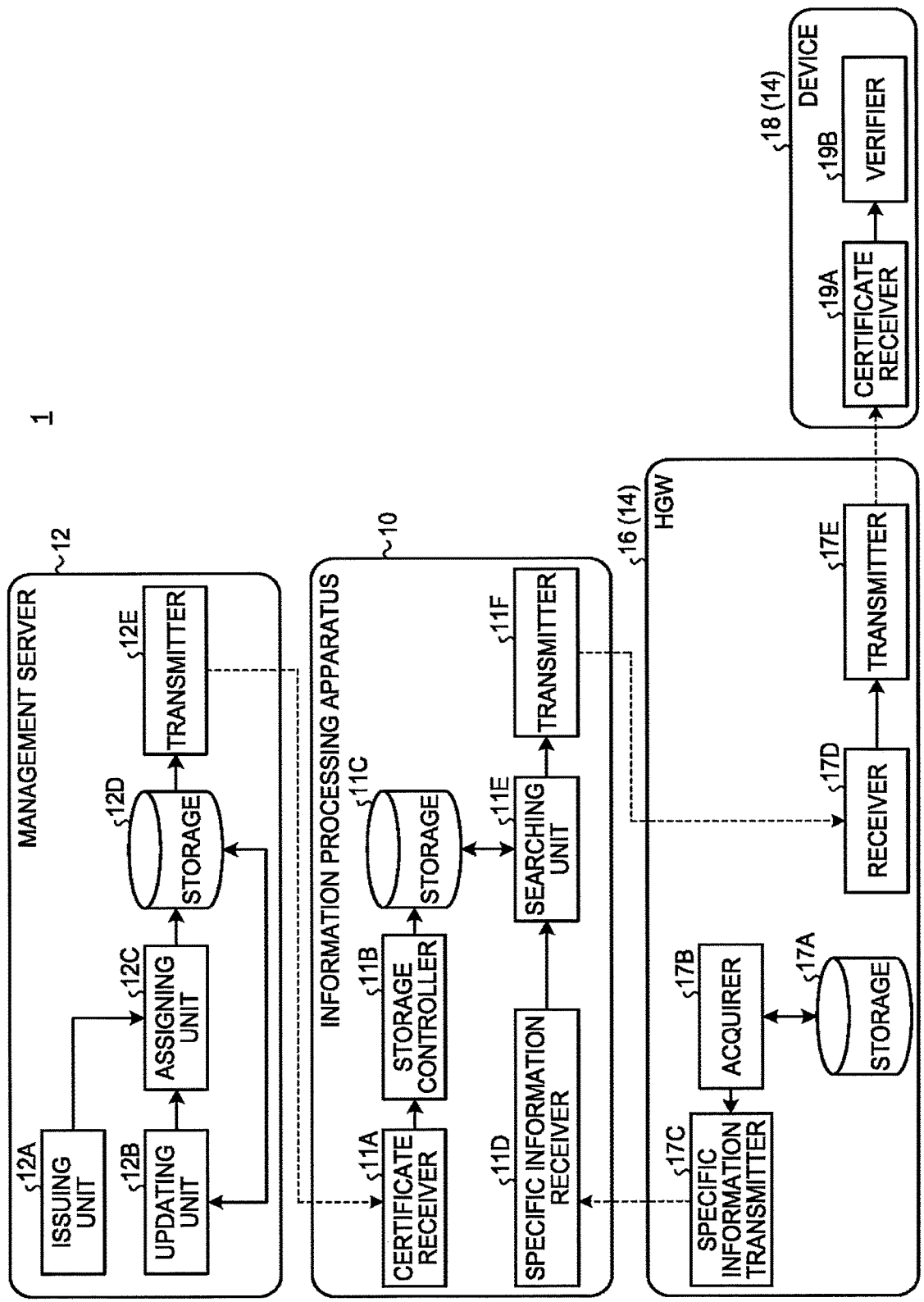
FIG. 3 is a functional block diagram of an information processing system.

FIG. 3 is an example of a functional block diagram of the information processing system 1 of the present embodiment. FIG. 3 illustrates an example of a functional block diagram of the information processing system 1 when the information processing system 1 executes the process of Step S100 to Step S112 in FIG. 2. In other words, FIG. 3 illustrates a case in which the HGW 16 is the authentication target of the public key certificate, and the device 18A is the authentication entity that verifies the public key certificate as an example.

The management server 12 corresponds to the certificate authority that issues the public key certificate. In the present embodiment, the management server 12 performs issuance, generation, or the like of the public key certificate. The management server 12 includes an issuing unit 12A, an updating unit 12B, an assigning unit 12C, storage 12D, and a transmitter 12E.

The issuing unit 12A, the updating unit 12B, the assigning unit 12C, and the transmitter 12E are realized, for example, by one or more processors.

For example, each of the issuing unit 12A, the updating unit 12B, the assigning unit 12C, and the transmitter 12E may be realized by causing a processor such as a central processing unit (CPU) to execute a program, that is, software. Each of these units may be realized by a processor such as a dedicated integrated circuit (IC), that is, hardware. Each of the above units may be realized by using software and hardware in combination. In the case of using a plurality of processors, each processor may realize one of the respective units or may realize two or more of the respective units.

The issuing unit 12A issues the public key certificate. The issuing unit 12A issues the public key certificate to each communication device 14 that is the authentication target. The issuing unit 12A issues the public key certificate to each communication device 14 using a known authentication technique based on the public key infrastructure (PKI). The public key certificate issued by the issuing unit 12A is referred to as a first public key certificate.

The assigning unit 12C assigns a signature (digital signature) to the first public key certificate issued by the issuing unit 12A using the private key of the management server 12 held in the management server 12 by a known method, and stores it in the storage 12D.

The updating unit 12B updates the first public key certificate stored in the storage 12D and generates a second public key certificate (which will be described in detail later). The assigning unit 12C assigns a signature (digital signature) to the second public key certificate generated by the updating unit 12B using the private key of the management server 12 held in the management server 12, and stores it in the storage 12D.

For this reason, the storage 12D stores one first public key certificate and one or more second public key certificates generated by updating the first public key certificate for each communication device 14 that is the authentication target.

Figure 4:
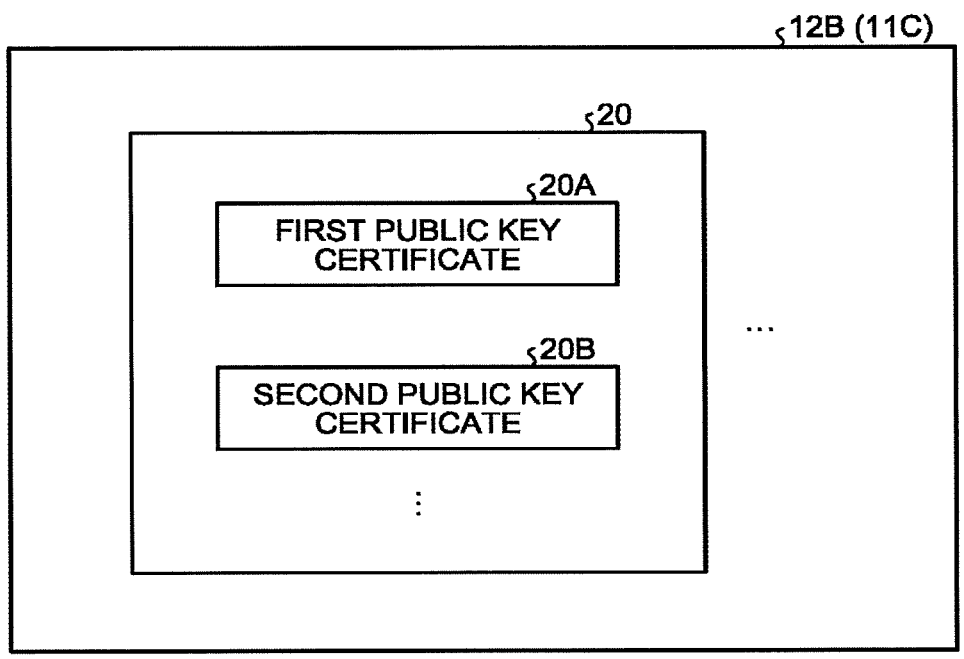
FIG. 4 is a schematic diagram of a data configuration of storage.

FIG. 4 is a schematic diagram illustrating an example of a data configuration of the storage 12D. As illustrated in FIG. 4, a public key certificate 20 is stored in the storage 12D for each communication device 14 that is the authentication target or for each purpose of the certificate. The public key certificate 20 includes a first public key certificate 20A and one or more second public key certificates 20B generated by updating the first public key certificate 20A.

Figure 5:
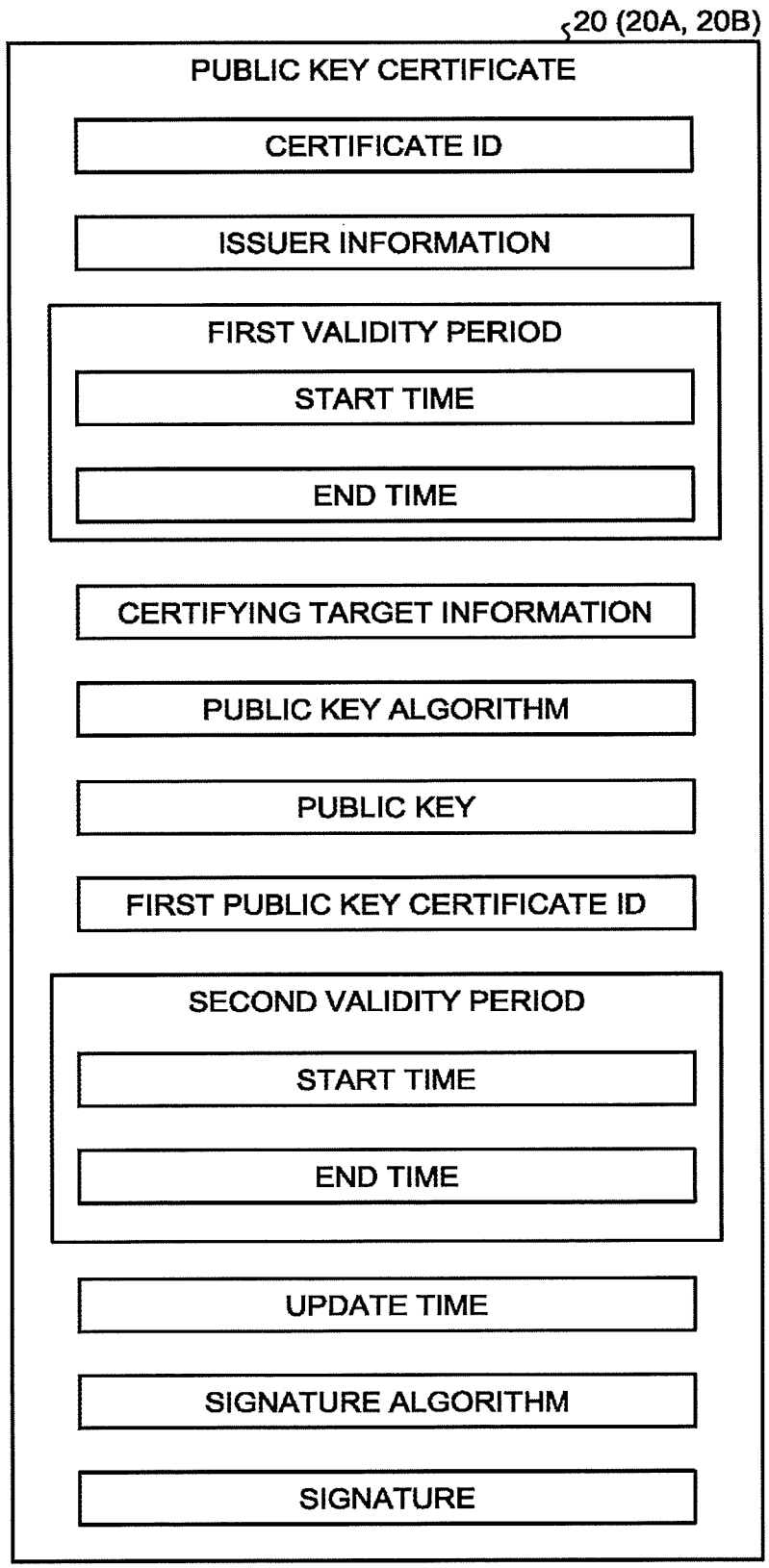
FIG. 5 is a schematic diagram of a data configuration of a public key certificate.

FIG. 5 is a schematic diagram illustrating an example of a data configuration of the public key certificate 20. In the following description, when the first public key certificate 20A and the second public key certificate 20B are collectively described, they are referred to collectively as a public key certificate 20.

The public key certificate 20 includes a certificate ID, issuer information, a first validity period, certifying target information, a public key algorithm, a public key, a first public key certificate ID, a second validity period, an update time, a signature algorithm, and a signature.

The certificate ID is identification information identifying the public key certificate 20. The certificate ID is information specific to the public key certificate 20 (each of the first public key certificate 20A and the second public key certificate 20B) including the certificate ID. The certificate ID is, for example, a serial number.

In a case in which the public key certificate 20 can be uniquely identified by other information included in the public key certificate 20, the public key certificate 20 need not necessarily include the certificate ID. For example, information in which at least two or more of the first validity period, the first public key certificate, the public key, and the second validity period that will be described later are combined may be used as the certificate ID.

The issuer information is information specifying the management server 12 that issues the public key certificate 20. The issuer information is indicated by, for example, a country, an organization, a department, or an address that holds the management server 12, an identification number identifying an organization, a name of the management server 12, identification information of the management server 12, the public key corresponding to the management server 12, or the like.

The first validity period is information indicating a validity period of the public key included in the public key certificate 20. In other words, the first validity period is information indicating the validity period of the public key certificate 20. The first validity period is information registered in the public key certificate 20 when the first public key certificate 20A is issued. The first validity period is indicated by a start time of the first validity period and an end time of the first validity period.

The start time of the first validity period indicates a start time of the validity period of the public key included in the public key certificate 20. The end time of the first validity period indicates an end time of the validity period of the public key included in the public key certificate 20. The start time and the end time are indicated by, for example, values indicating a year, a month, a day, an hour, a minute, a second by the coordinated universal time (UTC).

The certifying target information is information specifying the communication device 14 (the HGW 16 and the device 18) of the authentication target. The certifying target information is indicated by a country name, an organization name, a department name, a name, or an address that manufactures the communication device 14, an identification number specifying an organization, a type of communication device 14, an identification number of a type, an installation location of the communication device 14 (a country name, an organization name, a department name, a name, an address, or an identification number of an organization), or the like.

The public key algorithm is information specifying an algorithm of encryption or digital signature used when the public key is used.

The public key is a public key corresponding to the private key held in the communication device 14. The public key is used for verification of the signature assigned at the time of authentication of each of the communication devices 14, encryption of a message to be transmitted to the other communication devices 14, or the like.

The first public key certificate ID is a certificate ID of the public key certificate 20 of an update source of the public key certificate 20. As described above, the second public key certificate 20B is the public key certificate 20 generated by updating the first public key certificate 20A. The certificate ID of the first public key certificate 20A of the update source used for generating the second public key certificate 20B is included in the second public key certificate 20B as the first public key certificate ID.

The second validity period is information indicating the validity period of the public key included in the public key certificate 20. In other words, the second validity period is information indicating the validity period of the public key certificate 20. The second validity period indicates a period that is within the first validity period included in the public key certificate 20 including the second validity period and is shorter than the first validity period.

The second validity period is information set in the second public key certificate 20B when the second public key certificate 20B is generated by updating the first public key certificate 20A. The second validity period is indicated by a start time of the second validity period and an end time of the second validity period.

The start time of the second validity period indicates a start time of the second validity period of the public key included in the public key certificate 20. The end time of the second validity period indicates an end time of the second validity period of the public key included in the public key certificate 20. For example, the start time and the end time of the second validity period are indicated by values indicating a year, a month, a day, an hour, a minute, and a second by the coordinated universal time (UTC).

The update time indicates a next update time of public key certificate 20. In other words, the update time indicates a time at which the second public key certificate 20B is generated next time by updating the first public key certificate 20A. For example, the update time is indicated by a value indicating a year, a month, a day, an hour, a minute, and a second by the coordinated universal time (UTC).

The public key certificate 20 may be information including no update time. For example, there are cases in which the management server 12 and the communication device 14 are able to specify the update time by another means. In this case, the public key certificate 20 may be information including no update time. For example, the management server 12 and the communication device 14 may specify a timing that goes back a predetermined period from the end time of the second validity period as the update time. Further, the management server 12 and the communication device 14 may specify a timing at which a predetermined period of time has elapsed from the start time of the second validity period as the update time.

The signature algorithm is information specifying an algorithm used for generation of the signature or verification of the signature. The signature included in the public key certificate 20 is information indicating that the public key certificate 20 including the signature is the public key certificate 20 issued or generated by the management server 12.

It is desirable for the first public key certificate 20A to include at least the first validity period, the signature, and the public key. Further, it is desirable for the second public key certificate 20B to include at least the second validity period and the signature.

In detail, it is desirable for the first public key certificate 20A to include at least the certificate ID, the first validity period, the signature, and the public key. Further, it is desirable for the second public key certificate 20B to include at least the certificate ID, the second validity period, the first public key certificate ID, and the signature.

In the present embodiment, a case in which the first public key certificate 20A and the second public key certificate 20B have the data configuration illustrated in FIG. 5 will be described as an example. It is desirable that the certificate ID of the first public key certificate 20A be set in the first public key certificate ID of the first public key certificate 20A.

Returning to FIG. 3, the description will be continued. As described above, the updating unit 12B generates one or more second public key certificates 20B from one first public key certificate 20A. In detail, the updating unit 12B generates the second public key certificate 20B by updating at least the second validity period and the certificate ID in the first public key certificate 20A.

Specifically, the updating unit 12B generates the second public key certificate 20B by reading the first public key certificate 20A issued to each communication device 14 from the storage 12D and updating the second validity period and the certificate ID of the first public key certificate 20A. At this time, the updating unit 12B sets the second validity period that is within the first validity period included in the first public key certificate 20A and shorter than the first validity period in the second public key certificate 20B. Further, the updating unit 12B generates a plurality of second public key certificates 20B having different second validity periods from one first public key certificate 20A. The different second validity periods means that at least one of the start time of the second validity period and the end time of the second validity period is different.

Therefore, a plurality of second public key certificates 20B generated from one first public key certificate 20A differ in at least one of the start time of the second validity period and the end time of the second validity period. All the second validity periods of a plurality of second public key certificates 20B are periods that are within the first validity period of the first public key certificate 20A of the update source and shorter than the first validity period.

Further, the updating unit 12B sets the certificate ID of the first public key certificate 20A of the update source in the second public key certificate 20B as the first public key certificate ID. Therefore, since the first public key certificate IDs set in a plurality of second public key certificates 20B generated from one first public key certificate 20A indicate the first public key certificate 20A of the same update source and thus are the same information.

Further, the updating unit 12B updates the next update time. For example, the updating unit 12B may set a predetermined timing within a newly set second validity period as the next update time.

Further, the updating unit 12B sets a certificate ID uniquely identifying the second public key certificate 20B in each of the generated second public key certificates 20B.

As described above, the updating unit 12B generates the second public key certificate 20B by updating the second validity period, the update time, the first public key certificate ID, and the certificate ID in the first public key certificate 20A. Therefore, the same values as those in the first public key certificate 20A are set in the issuer information, the first validity period, the certification target information, the public key algorithm, the public key, and the signature algorithm included in the second public key certificate 20B. A new signature is assigned as the signature by an assigning unit 12C to be described later.

Figure 6:
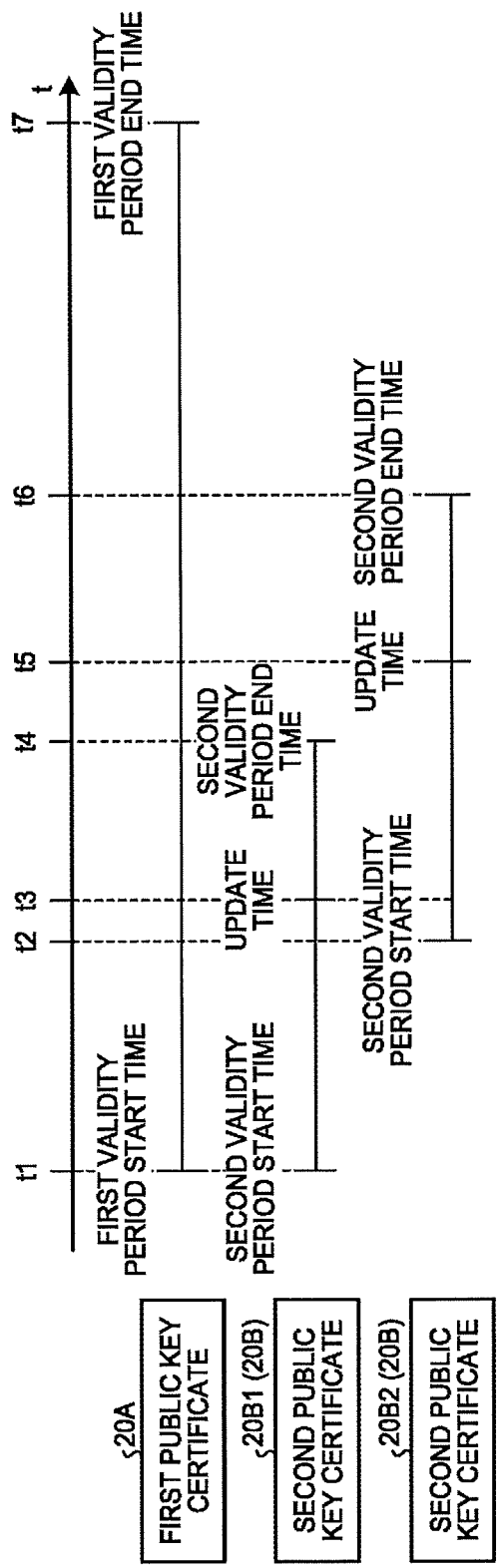
FIG. 6 is an explanatory diagram of issuance and generation of a public key certificate.

FIG. 6 is an explanatory diagram illustrating an example of issuance of the first public key certificate 20A and generation of the second public key certificate 20B. FIG. 6 illustrates a relation between the first validity period of the first public key certificate 20A and the second validity period of each of a plurality of second public key certificates 20B (a second public key certificate 20B1 and a second public key certificate 20B2) generated by updating the first public key certificate 20A.

Upon receiving the issuance request of the first public key certificate 20A or the like from the communication device 14 that is the authentication target, the issuing unit 12A issues the first public key certificate 20A. For example, the issuing unit 12A is assumed to issue the first public key certificate 20A in which the start time of the first validity period is a time t1, and the end time of the first validity period is a time t7.

The updating unit 12B generates one or more second public key certificates 20B by updating the first public key certificate 20A before the end time of the first validity period registered in the first public key certificate 20A.

For example, the updating unit 12B generates the second public key certificate 20B1 in which the start time of the second validity period is a time t1, and the end time of the second validity period is a time t4. The updating unit 12B also sets a time t3 that is a time between the time t1 and the time t4 as the update time. Further, the updating unit 12B sets the certificate ID of the first public key certificate 20A of the update source as the first public key certificate ID of the second public key certificate 20B1 and sets the certificate ID for identifying the second public key certificate 20B1. With this update process, the updating unit 12B generates the second public key certificate 20B1.

The updating unit 12B also generates the second public key certificate 20B2 in which the start time of the second validity period is a time t2, and the end time of the second validity period is a time t6. The updating unit 12B also sets a time t5 that is a time between the time t2 and the time t6 as the update time. The updating unit 12B sets the certificate ID of the first public key certificate 20A of the update source as the first public key certificate ID of the second public key certificate 20B2 and sets the certificate ID for identifying the second public key certificate 20B2. With this update process, the updating unit 12B generates the second public key certificate 20B2.

As described above, the updating unit 12B generates a plurality of second public key certificates 20B (the second public key certificate 20B1 and the second public key certificate 20B2) having the different second validity periods including the second validity period that is within the first validity period of the first public key certificate 20A and shorter than the first validity period.

As described above, it is desirable for the updating unit 12B to set the same values as those of the first public key certificate 20A of the update source as the issuer information, the first validity period, the certification target information, the public key algorithm, the public key, and the signature algorithm of the newly generated second public key certificate 20B. Further, it is desirable for the updating unit 12B to set the certificate ID of the update source as the first public key certificate ID included in the second public key certificate 20B.

The updating unit 12B generates one or more second public key certificates 20B by updating the first public key certificate 20A before the end time of the first validity period registered in the first public key certificate 20A. In detail, the updating unit 12B generates new second public key certificates 20B having the different second validity periods from the first public key certificate 20A of the same update source before the update time registered in the second public key certificate 20B generated last time. It is desirable for the updating unit 12B to repeat generation of the new second public key certificate 20B until an invalidation reason for invalidating the public key certificate 20 occurs.

The updating unit 12B may collectively generate a plurality of second public key certificates 20B from one first public key certificate 20A at the same time. In this case, when an invalidation reason for invalidating the public key certificate 20 occurs, it is desirable for the updating unit 12B to newly generate the second public key certificate 20B.

Returning to FIG. 3, the description will be continued. Each time the new second public key certificate 20B is generated by the updating unit 12B, the assigning unit 12C assigns the signature to the second public key certificate 20B and stores it in the storage 12D.

Therefore, in the storage 12D, one first public key certificate 20A and one or more second public key certificates 20B generated by updating at least the second validity period and the signature of the first public key certificate 20A are registered for each communication device 14 (see FIG. 2).

Here, there are cases in which an invalidation reason for invalidating the public key certificate 20 occurs. In this case, it is desirable for the updating unit 12B to generate the second public key certificate 20B specifying an invalidation reason occurrence time. The invalidation reason occurrence time is a time at which an invalidation reason has occurred.

Figure 7:
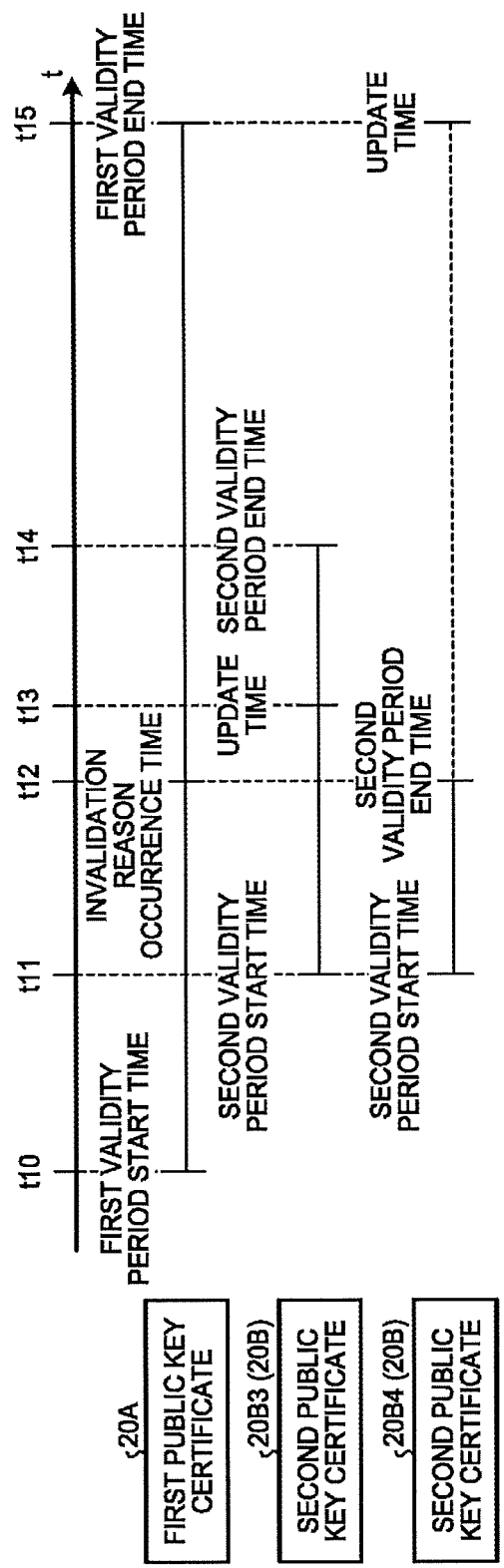
FIG. 7 is an explanatory diagram of generation of a second public key certificate.

FIG. 7 is an explanatory diagram illustrating an example of generation of the second public key certificate 20B when an invalidation reason occurs.

It is assumed that the start time of the first validity period of the first public key certificate 20A issued by the issuing unit 12A is a time t10, and the end time of the first validity period is a time t15.

The updating unit 12B generates one or more second public key certificates 20B by updating the first public key certificate 20A before the end time of the first validity period registered in the first public key certificate 20A. Similarly to FIG. 6, the updating unit 12B generates a second public key certificate 20B3 in which the second validity period that is within the first validity period of the first public key certificate 20A and shorter than the first validity period is registered. For example, the updating unit 12B generates the second public key certificate 20B3 in which the start time of the second validity period is a time t11, the end time of the second validity period is a time t14, and the update time is t13.

At this time, an invalidation reason for invalidating the public key certificate 20 is assumed to occur at a time t12 that is a timing between the time t11 and the time t13.

In this case, the updating unit 12B generates a second public key certificate 20B4 including the end time of the first validity period indicating the invalidation reason occurrence time or the end time of the second validity period indicating the invalidation reason occurrence time. The invalidation reason occurrence time is a time at which the invalidation reason has occurred.

For example, as illustrated in FIG. 7, the updating unit 12B generates the second public key certificate 20B4 in which the end time of the second validity period is set to a time t12 that is the invalidation reason occurrence time.

In this case, the communication device 14 (the HGW 16 and the device 18) can confirm the invalidation of the second public key certificate 20B4 by confirming that the end time of the second validity period included in the second public key certificate 20B4 has passed the current time.

As described above, the updating unit 12B may set the time t12 that is the invalidation reason occurrence time as the end time of the first validity period.

In this case, the communication device 14 (the HGW 16 and the device 18) can confirm the invalidation of the second public key certificate 20B4 by confirming that the end time of the first validity period included in the second public key certificate 20B4 has passed the current time.

Further, when an invalidation reason occurs, the updating unit 12B may generate the second public key certificate 20B4 in which a generation time of the second public key certificate 20B4 is set as the end time of the second validity period. Further, when an invalidation reason occurs, the updating unit 12B may set the end time of the second validity period of the second public key certificate 20B3 generated last time as the end time of the second validity period of the second public key certificate 20B4 newly generated after the invalidation reason occurs.

Further, when an invalidation reason occurs, the updating unit 12B may generate the second public key certificate 20B4 in which a time after the end time of the included second validity period is set as the update time.

Further, when an invalidation reason occurs, the updating unit 12B may end the generation of the new second public key certificate 20B. For example, there are cases in which it is guaranteed that the information processing apparatus 10 does not deliver the issued and generated public key certificate 20 (the first public key certificate 20A and the second public key certificate 20B) to the communication device 14, and the second validity period included in the second public key certificate 20B generated last time is sufficiently short.

In this case, when an invalidation reason occurs, the updating unit 12B may end the generation of the new second public key certificate 20B.

In this case, the communication device 14 can specify the invalidation of the public key certificate 20 by confirming that the end time of the second validity period included in the second public key certificate 20B has been passed, and the new second public key certificate 20B is not generated using the first public key certificate 20A of the update source.

Returning to FIG. 3, the description will be continued. When the first public key certificate 20A is generated by the issuing unit 12A, the assigning unit 12C assigns the signature to the first public key certificate 20A and stores it in the storage 12D. Further, the assigning unit 12C assigns the signature to the second public key certificate 20B updated by the updating unit 12B and stores it in the storage 12D. Further, it is desirable to use the private key of the management server 12 held in advance in the management server 12 and the signature algorithm set in the public key certificate 20 for generation of the signature.

Therefore, in the storage 12D, the first public key certificate 20A and one or more second public key certificates 20B generated by updating at least the second validity period of the first public key certificate 20A are stored for each communication device 14 of the authentication target as illustrated in FIG. 4.

The transmitter 12E transmits the public key certificate 20 (the first public key certificate 20A and the second public key certificate 20B) stored in the storage 12D to the information processing apparatus 10. For example, it is desirable for the transmitter 12E to transmit the new public key certificate 20 to the information processing apparatus 10 each time the new public key certificate 20 (the first public key certificate 20A and the second public key certificate 20B) is stored in the storage 12D.

Next, a functional configuration of the information processing apparatus 10 will be described. The information processing apparatus 10 delivers the public key certificate 20 issued/generated by the management server 12 to the communication device 14.

The information processing apparatus 10 includes a certificate receiver 11A, a storage controller 11B, storage 11C, a specific information receiver 11D, a searching unit 11E, and a transmitter 11F. The certificate receiver 11A, the storage controller 11B, the specific information receiver 11D, the searching unit 11E, and the transmitter 11F are realized, for example, by one or more processors.

For example, the certificate receiver 11A, the storage controller 11B, the specific information receiver 11D, the searching unit 11E, and the transmitter 11F may be realized by causing the processor such as a CPU to execute a program, that is, software. Each of these units may be realized by a processor such as a dedicated IC, that is, hardware. Each of the above units may be realized using software and hardware in combination. In the case of using a plurality of processors, each processor may realize one of the respective units or may realize two or more of the respective units.

The certificate receiver 11A receives the public key certificate 20 from the management server 12. In other words, the certificate receiver 11A receives the first public key certificate 20A and the second public key certificate 20B from the management server 12. The storage controller 11B stores the first public key certificate 20A and the second public key certificate 20B received from the management server 12 in the storage 11C.

Therefore, the public key certificate 20 generated for each communication device 14 is stored in the storage 11C. The first public key certificate 20A and one or more second public key certificates 20B generated by updating at least the second validity period of the first public key certificate 20A are included in the public key certificate 20.

A data format of the public key certificate 20 stored in the storage 11C is not limited. For example, the storage 11C stores the public key certificate 20 in a data format that is searchable by the searching unit 11E to be described later. For example, the storage 11C may be a database in which the search key and the public key certificate 20 (the first public key certificate 20A and the second public key certificate 20B) are associated with each other. The search key is, for example, at least one of the issuer information, the first public key certificate ID, the public key, the certificate ID, and the certifying target information included in the public key certificate 20.

The specific information receiver 11D receives specific information of the first public key certificate 20A. The specific information receiver 11D is an example of a receiver. The specific information receiver 11D receives the specific information from the communication device 14. In the present embodiment, the specific information receiver 11D receives the specific information from the HGW 16.

The specific information may be any information specifying the first public key certificate 20A. The specific information is indicated by at least one of, for example, the certificate ID, the first public key certificate ID, the public key, the issuer information, and the certifying target information of the first public key certificate 20A.

The searching unit 11E searches for the first public key certificate 20A specified by the specific information received by the specific information receiver 11D from the storage 11C. Then, the storage 11C searches for the second public key certificate 20B including the second validity period in which the start time of the second validity period is before the current time among one or more second public key certificates 20B generated from the searched first public key certificate 20A from the storage 11C.

For example, the specific information is assumed to be the first public key certificate ID. In this case, the searching unit 11E searches for the second public key certificate 20B including the first public key certificate ID from the storage 11C.

For example, the second public key certificate 20B1 and the second public key certificate 20B2 illustrated in FIG. 6 are assumed to be stored in the storage 11C as the second public key certificate 20B generated from the first public key certificate 20A specified by the specific information. In this case, the searching unit 11E searches for the second public key certificate 20B1 and the second public key certificate 20B2.

Further, the current time is assumed to be the time t5. In this case, the searching unit 11E searches for the second public key certificate 20B2 including the second validity period whose start time is before the current time (time t5) out of the second public key certificate 20B1 and the second public key certificate 20B2.

Then, the transmitter 11F transmits the searched second public key certificate 20B2 to the communication device 14 of the transmission source of the specific information.

Further, there are cases in which the searching unit 11E searches for a plurality of second public key certificates 20B. In other words, there are cases in which there are a plurality of second public key certificates 20B including the first public key certificate ID that is specific information and the second validity period whose start time is before the current time.

In this case, it is desirable for the transmitter 11F to transmit one second public key certificate 20B in which the start time of the second validity period is before the current time, and the end time of the second validity period is latest (that is, the most future time) among a plurality of second public key certificates 20B searched for by the searching unit 11E to the communication device 14 of the transmission source of the specific information.

Specifically, it is assumed that the second public key certificate 20B1 and the second public key certificate 20B2 illustrated in FIG. 6 are stored in the storage 11C, and the current time is the time t3. In this case, the searching unit 11E searches for the second public key certificate 20B1 and the second public key certificate 20B2 as the second public key certificate 20B including the second validity period including time t3 that is the current time.

In a case in which a plurality of second public key certificates 20B (the second public key certificate 20B1 and the second public key certificate 20B2) are searched for, it is desirable for the transmitter 11F to transmit the second public key certificate 20B2 in which the start time of the second validity period is before the time t3 that is the current time, and the end time of the second validity period is latest (that is, the most future time) to the communication device 14 of the transmission source of the specific information.

Further, in a case in which a plurality of second public key certificates 20B are searched for, the transmitter 11F may transmit the recently generated second public key certificate 20B. Specifically, the certificate ID is assumed to be a serial number. In this case, it is desirable for the transmitter 11F to transmit one of the plurality of second public key certificate 20B having the certificate ID of the highest value among a plurality of searched second public key certificates 20B as the recently generated second public key certificate 20B.

Further, there are cases in which the second public key certificate 20B generated from the first public key certificate 20A specified by the specific information is not registered in the storage 11C. In this case, it is desirable for the searching unit 11E to search for the first public key certificate 20A specified by the specific information as the transmission target to the communication device 14. In this case, it is desirable for the transmitter 11F to transmit the first public key certificate 20A to the communication device 14 of the transmission source of the specific information.

Further, the searching unit 11E may perform it prior to the specific information receiver 11D. For example, the second public key certificate 20B searched for by the searching unit 11E may be arranged at a uniform resource identifier (URI) corresponding to each set of possible specific information in advance, and when an access to the URI associated with the specific information is received, the second public key certificate 20B may be transmitted as a response.

Further, there are cases in which the current time is included in the first validity period but not included in the second validity period. In this case, it is desirable for the searching unit 11E to search for the first public key certificate 20A specified by the specific information as the transmission target to the communication device 14. In this case, it is desirable for the transmitter 11F to transmit the first public key certificate 20A to the communication device 14 of the transmission source of the specific information.

Next, a function of the HGW 16 will be described.

The HGW 16 includes storage 17A, an acquirer 17B, a specific information transmitter 17C, a receiver 17D, and a transmitter 17E. The acquirer 17B, the specific information transmitter 17C, the receiver 17D, and the transmitter 17E are realized by, for example, one or more processors.

For example, the acquirer 17B, the specific information transmitter 17C, the receiver 17D, and the transmitter 17E may be realized by causing a processor such as a CPU to execute a program, that is, software. Each of these units may be realized by a processor such as a dedicated IC, that is, hardware. Each of the above units may be realized using software and hardware in combination. In the case of using a plurality of processors, each processor may realize one of the respective units or may realize two or more of the respective units.

The acquirer 17B acquires the specific information from the storage 17A. In the present embodiment, the storage 17A stores the public key certificate 20 (the first public key certificate 20A and the second public key certificate 20B) for certifying the HGW 16 that is received from the information processing apparatus 10. The public key certificate 20 for certifying the HGW 16 is a public key certificate 20 used when the device 18 communicating with the HGW 16 authenticates that a communication destination is the HGW 16. The public key certificate 20 for certifying the HGW 16 is a public key certificate 20 for authenticating that various types of information transmitted from the HGW 16 is information having the HGW 16 as the transmission source.

In other words, the public key certificate 20 previously issued/generated by the management server 12 having the HGW 16 equipped with the acquirer 17B as the authentication target is stored in the storage 17A.

Therefore, the acquirer 17B acquires the first public key certificate ID included in the public key certificate 20 stored in the storage 17A as the specific information of the first public key certificate 20A for certifying the HGW 16. As described above, the specific information is indicated by at least one of, for example, the certificate ID, the first public key certificate ID, the public key, the issuer information, and the certifying target information of the first public key certificate 20A. Therefore, it is desirable for the acquirer 17B to acquire the specific information by reading at least one of the certificate ID, the first public key certificate ID, the public key, the issuer information, and the certifying target information of the first public key certificate 20A from the storage 17A.

The specific information transmitter 17C transmits the specific information acquired by the acquirer 17B to the information processing apparatus 10. It is desirable for the specific information transmitter 17C to transmit the specific information to the information processing apparatus 10 when the acquirer 17B acquires the specific information.

An acquisition timing of the specific information by the acquirer 17B is not limited. For example, when the update time set in the public key certificate 20 stored in the storage 17A is a time of the future rather than the current time, and the current time approaches the update time, it is desirable for the acquirer 17B to acquire the specific information of the first public key certificate 20A for authenticating the HGW 16. Further, it is desirable for the specific information transmitter 17C to transmit the specific information acquired by the acquirer 17B to the information processing apparatus 10.

The receiver 17D receives the public key certificate 20 corresponding to the specific information transmitted by the specific information transmitter 17C from the information processing apparatus 10. As described above, the information processing apparatus 10 transmits the second public key certificate 20B including the second validity period in which the start time of the second validity period is before the current time among one or more second public key certificates 20B generated from the first public key certificate 20A specified by the specific information received from the HGW 16 to the HGW 16.

Therefore, in the present embodiment, the receiver 17D of the HGW 16 receives the second public key certificate 20B including the second validity period in which the start time of the second validity period is before the current time among a plurality of second public key certificates 20B generated using the first public key certificate 20A for certifying the HGW 16.

Further, the receiver 17D may check whether or not the first public key certificate ID included in the received second public key certificate 20B coincides with the certificate ID of the first public key certificate 20A specified by the specific information transmitted by the specific information transmitter 17C. In a case in which they coincide with each other, the receiver 17D may output the second public key certificate 20B to the transmitter 17E.

The transmitter 17E transmits the second public key certificate 20B received by the receiver 17D to the device 18 of a communication target.

Next, a functional configuration of the device 18 will be described. The device 18 includes a certificate receiver 19A and a verifier 19B. The certificate receiver 19A and the verifier 19B are realized by, for example, one or more processors.

For example, the certificate receiver 19A and the verifier 19B may be realized by causing a processor such as a CPU to execute a program, that is, software. Each of these units may be realized by a processor such as a dedicated IC, that is, hardware. Each of the above units may be realized by using software and hardware in combination. In the case of using a plurality of processors, each processor may realize one of the respective units, or may realize two or more of the respective units.

The certificate receiver 19A receives the second public key certificate 20B for certifying the HGW 16 from the HGW 16. The verifier 19B verifies the second public key certificate 20B received by the certificate receiver 19A. In the present embodiment, the verifier 19B verifies the validity of the second public key certificate 20B.

In the present embodiment, when the current time is included in the second validity period included in the second public key certificate 20B, the verifier 19B verifies that the second public key certificate 20B is valid. Specifically, the verifier 19B verifies the validity of the second public key certificate 20B by verifying whether or not the current time is included in both the first validity period and the second validity period included in the second public key certificate 20B. Further, the verifier 19B verifies whether or not the second public key certificate 20B is issued by the management server 12 by verifying the signature included in the second public key certificate 20B using the public key of the management server 12 that is held in advance.

The verifier 19B may further verify whether or not the update time included in the second public key certificate 20B is later than the current time. When the update time is later than the current time, the certificate receiver 19A may newly receive the updated latest second public key certificate 20B from the HGW 16.

There are cases in which the information processing apparatus 10 transmits the first public key certificate 20A to the HGW 16 as described above. In this case, it is desirable for the device 18 to verify the first public key certificate 20A similarly to the above example.

As described above, when an invalidation reason occurs, the updating unit 12B of the management server 12 generates the second public key certificate 20B including the invalidation reason occurrence time, the end time of the first validity period indicating the invalidation reason occurrence time, or the end time of the second validity period indicating the invalidation reason occurrence time.

Therefore, the verifier 19B of the device 18 can confirm the invalidation of the second public key certificate 20B by confirming that the end time of the second validity period included in the second public key certificate 20B has passed the current time. In other words, in this case, the information processing apparatus 10B can specify the invalidation of the second public key certificate 20B.

As described above, the updating unit 12B of the management server 12 may end the generation of the new second public key certificate 20B when an invalidation reason occurs. In this case, the verifier 19B of the device 18 can specify the invalidation of the public key included in the public key certificate 20 by confirming that the end time of the second validity period included in the second public key certificate 20B has been passed, and the new second public key certificate 20B is not generated using the first public key certificate 20A of the update source. Then, when the invalidation is specified, the verifier 19B can specify the invalidation of the second public key certificate 20B.

Figure 8:
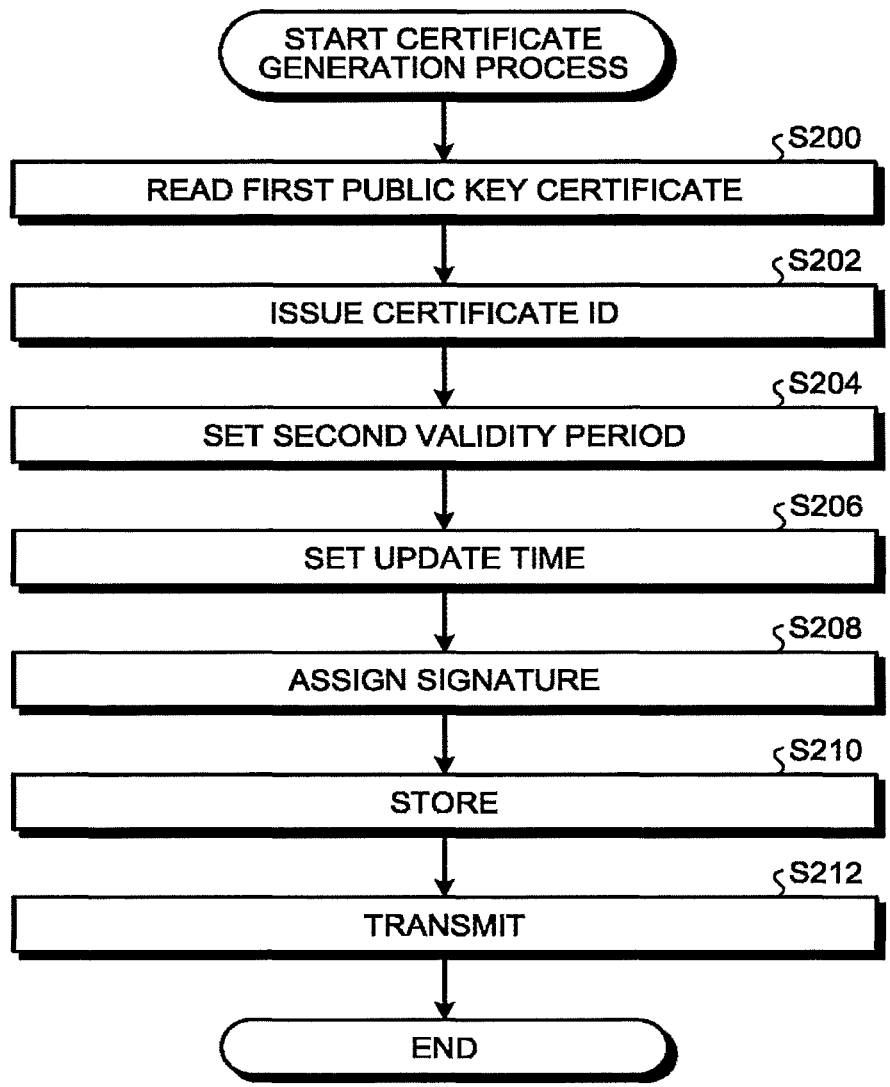
FIG. 8 is a flowchart illustrating a procedure of a generation process.

Next, an example of a procedure of a generation process of the second public key certificate 20B executed by the management server 12 will be described. FIG. 8 is a flowchart illustrating an example of the procedure of the generation process of the second public key certificate 20B.

The updating unit 12B reads the first public key certificate 20A from the storage 12D (Step S200). Then, the updating unit 12B issues a new certificate ID (Step S202). There are cases in which another second public key certificate 20B has already been generated from the first public key certificate 20A read in Step S200. In this case, the updating unit 12B issues a unique value different from the generated second public key certificate 20B or the first public key certificate 20A as the certificate ID. For example, it is desirable for the updating unit 12B to internally hold an integer value, cause the integer value to be increased by 1 each time a new certificate ID is issued, and use the increased value as the new certificate ID.

Then, the updating unit 12B sets the second validity period that is within the first validity period of the first public key certificate 20A read in Step S200 and shorter than the first validity period (Step S204). There are cases in which the second public key certificate 20B has already been generated from the first public key certificate 20A read in Step S200. In this case, the updating unit 12B sets the second validity period different from the generated second public key certificate 20B.

For example, when an invalidation reason does not occur, it is desirable for the updating unit 12B to set the start time of the second validity period as a process start time of Step S204 and set a time after a predetermined period of time elapses from the start time as the end time of the second validity period.

Further, for example, when an invalidation reason occurs, it is desirable for the updating unit 12B to set the start time of the second validity period as the start time of the first validity period and set the end time of the second validity period as the invalidation reason occurrence time.

Then, the updating unit 12B sets the update time (Step S206).

For example, when an invalidation reason does not occur, it is desirable for the updating unit 12B to set a time between the start time and the end time of the second validity period set in Step S204 as the update time. Further, when an invalidation reason occurs, it is desirable to set the end time of the first validity period of the first public key certificate 20A read in Step S200 as the update time.

With the process of Step S202 to Step S206, the updating unit 12B generates the second public key certificate 20B in which the first public key certificate 20A read in Step S200 has been updated.

Then, the assigning unit 12C assigns the signature to the second public key certificate 20B generated in the process of Step S202 to Step S206 (Step S208), and stores the second public key certificate 20B in the storage 12D (Step S210). The transmitter 12E transmits the second public key certificate 20B generated in the process of Step S202 to Step S206 to the information processing apparatus 10 (Step S212). Then, the present routine ends.

Then, an example of a procedure of information processing executed by the information processing apparatus 10 will be described.

Figure 9:
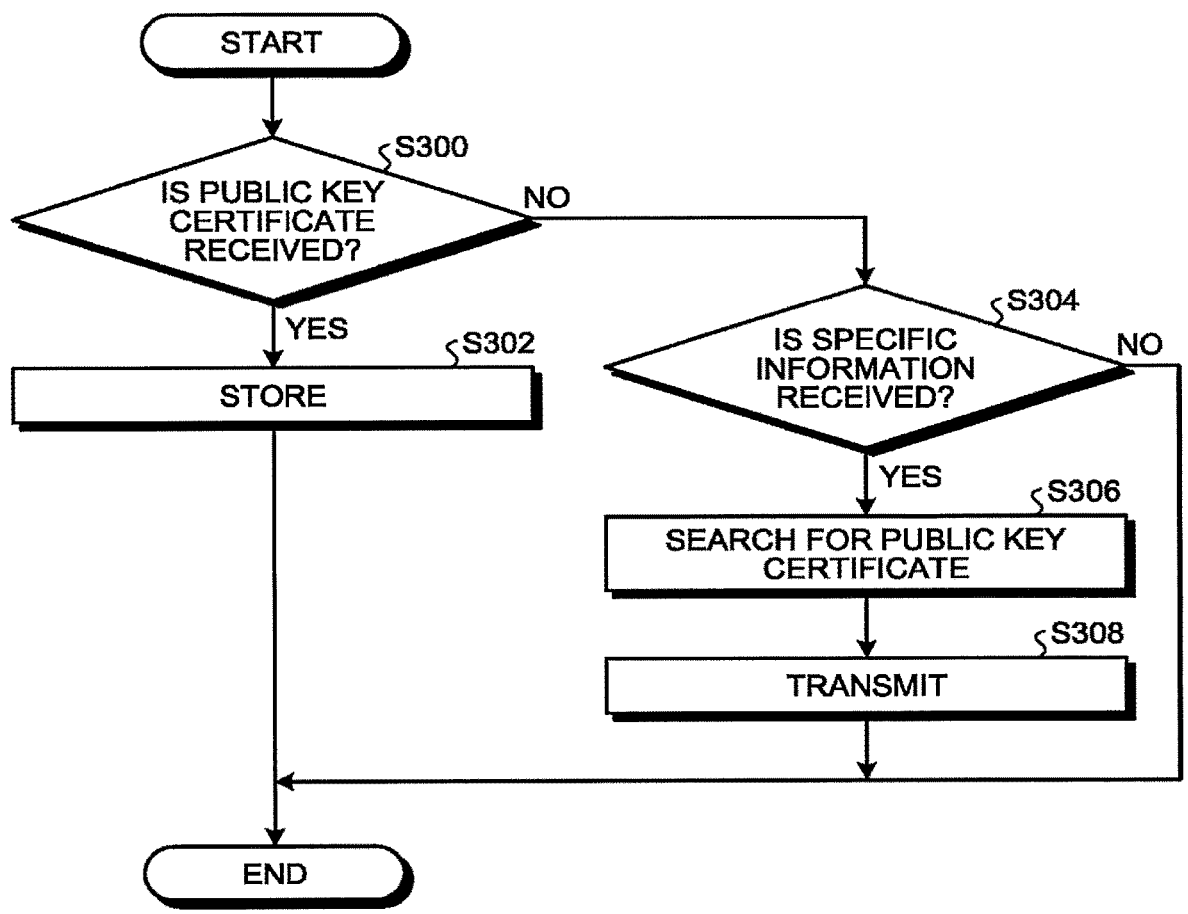
FIG. 9 is a flowchart illustrating a procedure of information processing.

FIG. 9 is a flowchart illustrating an example of a procedure of information processing executed by the information processing apparatus 10.

First, the certificate receiver 11A determines whether or not the public key certificate 20 is received from the management server 12 (Step S300).

When the public key certificate 20 is received (Step S300: Yes), the process proceeds to Step S302. In Step S302, the storage controller 11B stores the public key certificate 20 received in Step S300 in the storage 11C (Step S302). Then, the present routine ends.

On the other hand, when a negative determination is obtained in Step S300 (Step S300: No), the process proceeds to Step S304. In Step S304, the specific information receiver 11D determines whether or not the specific information is received from the communication device 14 (Step S304). If a negative determination is obtained in Step S304 (Step S304: No), the present routine ends. If a positive determination is obtained in Step S304 (Step S304: Yes), the process proceeds to Step S306.

In Step S306, the searching unit 11E searches for the first public key certificate 20A specified by the specific information received in Step S304 from the storage 11C. Then, the storage 11C searches for the second public key certificate 20B including the second validity period in which the start time of the second validity period is before the current time among one or more second public key certificates 20B generated from the searched first public key certificate 20A (Step S306).

Then, the transmitter 11F transmits the second public key certificate 20B searched for in Step S306 to the communication device 14 of the transmission source of the specific information in Step S304 (Step S308), and ends the present routine.

Figure 10:
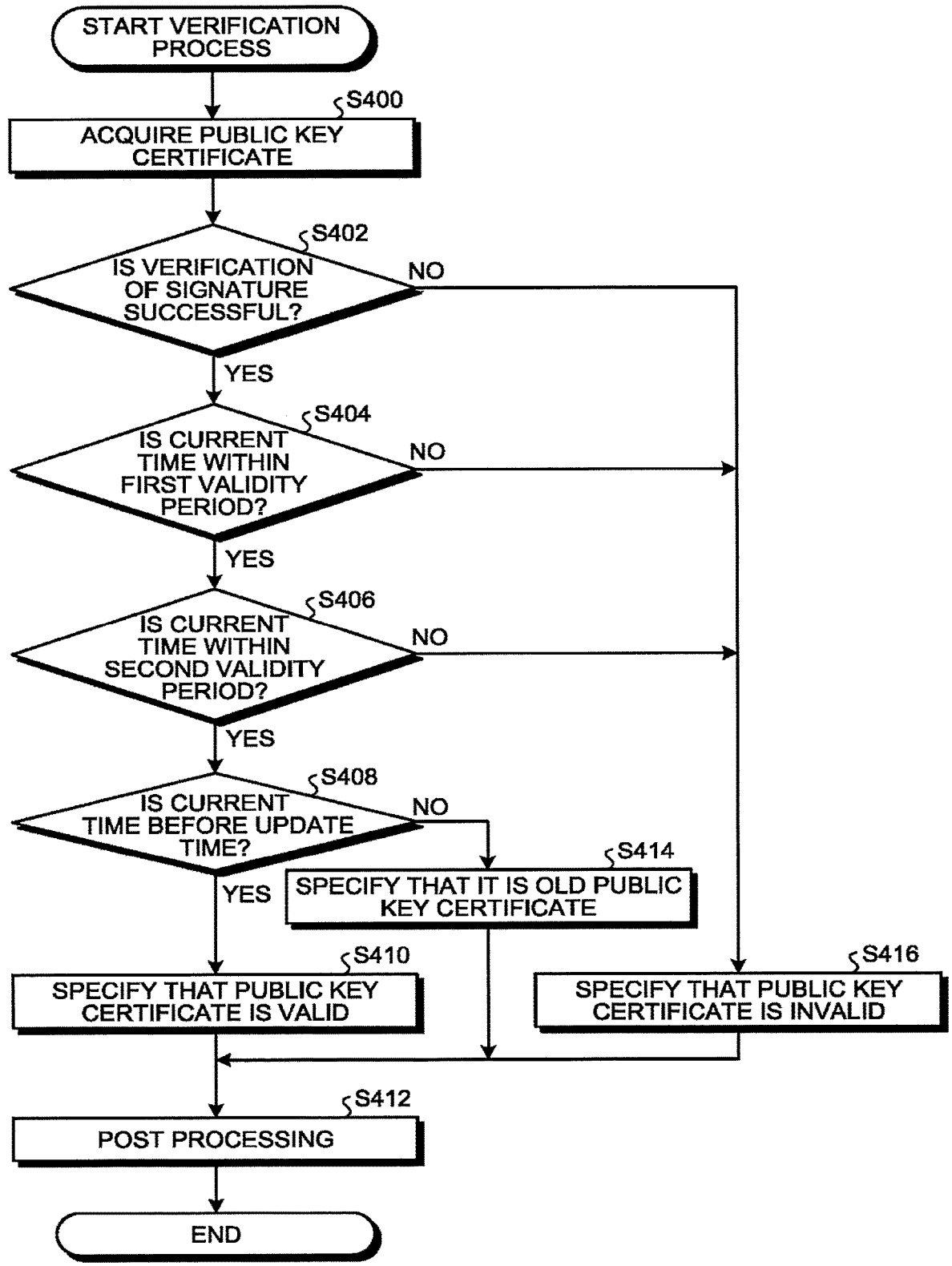
FIG. 10 is a flowchart illustrating a procedure of a verification process.

Next, an example of a procedure of a verification process of the public key certificate 20 will be described. FIG. 10 is a flowchart illustrating an example of the procedure of the verification process of the public key certificate 20. In the present embodiment, the device 18 executes the verification process.

First, the certificate receiver 19A acquires the public key certificate 20 of the HGW 16 from the HGW 16 (Step S400). In the flowchart illustrated in FIG. 10, a case in which the second public key certificate 20B is acquired will be described as an example.

The verifier 19B verifies the signature included in the second public key certificate 20B received in Step S400 and determines whether or not the verification of the signature is successful (Step S402). If a negative determination is obtained in Step S402 (Step S402: No), the process proceeds to Step S416. In Step S416, the verifier 19B specifies that the second public key certificate 20B acquired in Step S400 is invalid (Step S416). Then, the process proceeds to Step S412 to be described later.

On the other hand, when the signature verification is successful (Step S402: Yes), the process proceeds to Step S404. In Step S404, the verifier 19B determines whether or not the current time is within the first validity period indicated by the second public key certificate 20B received in Step S400 (Step S404). If a negative determination is obtained in Step S404 (Step S404: No), the process proceeds to Step S416.

If a positive determination is obtained in Step S404 (Step S404: Yes), the process proceeds to Step S406. In Step S406, the verifier 19B determines whether or not the current time is within the second validity period indicated by the second public key certificate 20B received in Step S400 (Step S406). If a negative determination is obtained in Step S406 (Step S406: No), the process proceeds to Step S416.

If a positive determination is obtained in Step S406 (Step S406: Yes), the process proceeds to Step S408. In Step S408, the verifier 19B determines whether or not the current time is before the update time included in the second public key certificate 20B received in Step S400 (Step S408). If a negative determination is obtained in Step S408 (Step S408: No), the process proceeds to Step S414.

In Step S414, the verifier 19B specifies that the second public key certificate 20B received in Step S400 is an old public key certificate 20 (Step S414). Then, the process proceeds to Step S412 to be described later.

If a positive determination is obtained in Step S408 (Step S408: Yes), the process proceeds to Step S410. In Step S410, the verifier 19B specifies that the second public key certificate 20B received in Step S400 is valid (Step S410). Then, the process proceeds to Step S412.

In Step S412, the device 18 executes a predetermined process on the basis of the specifying results of Step S410, Step S414, and Step S416 (Step S412). Then, the present routine ends. For example, when it is specified that the first public key certificate 20A is valid, the device 18 starts communication with the HGW 16. Further, for example, when it is specified that the first public key certificate 20A is the old public key certificate 20, the device 18 discards the public key certificate 20 and outputs a request for a new second public key certificate 20B to the HGW 16. Further, for example, when it is specified that the first public key certificate 20A is invalid, the device 18 invalidates communication with the HGW 16.

As described above, the information processing apparatus 10 of the present embodiment includes the storage controller 11B, the specific information receiver 11D, and the transmitter 11F. The storage controller 11B stores the first public key certificate 20A including at least the first validity period, the signature, and the public key and a plurality of second public key certificates 20B with the different second validity periods that are generated by updating the first public key certificate 20A and includes the signature and the second validity period that is within the first validity period and shorter than the first validity period in the storage 11C. The specific information receiver 11D receives the specific information of the first public key certificate 20A. The transmitter 11F transmits one of the plurality of second public key certificate 20B including the second validity period in which the start time of the second validity period is before the current time and generated from the first public key certificate 20A specified by the received specific information to the transmission source of the specific information.

As described above, the information processing apparatus 10 transmits one of the plurality of second public key certificate 20B including the second validity period that is within the first validity period and shorter than the first validity period to the transmission source of the specific information.

Therefore, it is possible for the use entity of the public key certificate that has transmitted the specific information to verify the validation or invalidation of the second public key certificate 20B by verifying the second validity period included in the second public key certificate 20B.

In other words, the side of using the second public key certificate 20B can verify the validation or the invalidation of the second public key certificate 20B without managing or searching for the certificate revocation list (CRL) that is a list of revoked public key certificates as in the related art.

Therefore, the information processing apparatus 10 of the present embodiment can reduce the load of the use entity of the public key certificate 20.

In the present embodiment, the example in which the management server 12 and the information processing apparatus 10 are configured separately has been described as an example. However, the management server 12 and the information processing apparatus 10 may be integrally configured.

It is desirable to configure the management server 12 and the information processing apparatus 10 as separate entities. In this case, the information processing apparatus 10 functions as a delivery server that is accessed from the HGW 16 and delivers the public key certificate 20 to the HGW 16.

When the management server 12 and the information processing apparatus 10 are configured as separate entities, it is possible to reduce the processing load of the management server 12 in addition to the above effects.

Further, in the present embodiment, the mode in which the device 18 performs communication with the information processing apparatus 10 via the HGW 16 has been described by way of example. However, the device 18 may perform communication with the information processing apparatus 10 without going through the HGW 16.

First Modified Example

In the above embodiment, a case in which the second public key certificate 20B includes the certificate ID, the issuer information, the first validity period, the certifying target information, the public key algorithm, the public key, the first public key certificate ID, the second validity period, the update time, the signature algorithm, and the signature as illustrated in FIG. 5 has been described as an example.

However, as described in the above embodiment, it is desirable for the second public key certificate 20B to include at least the second validity period and the signature.

Figure 11:
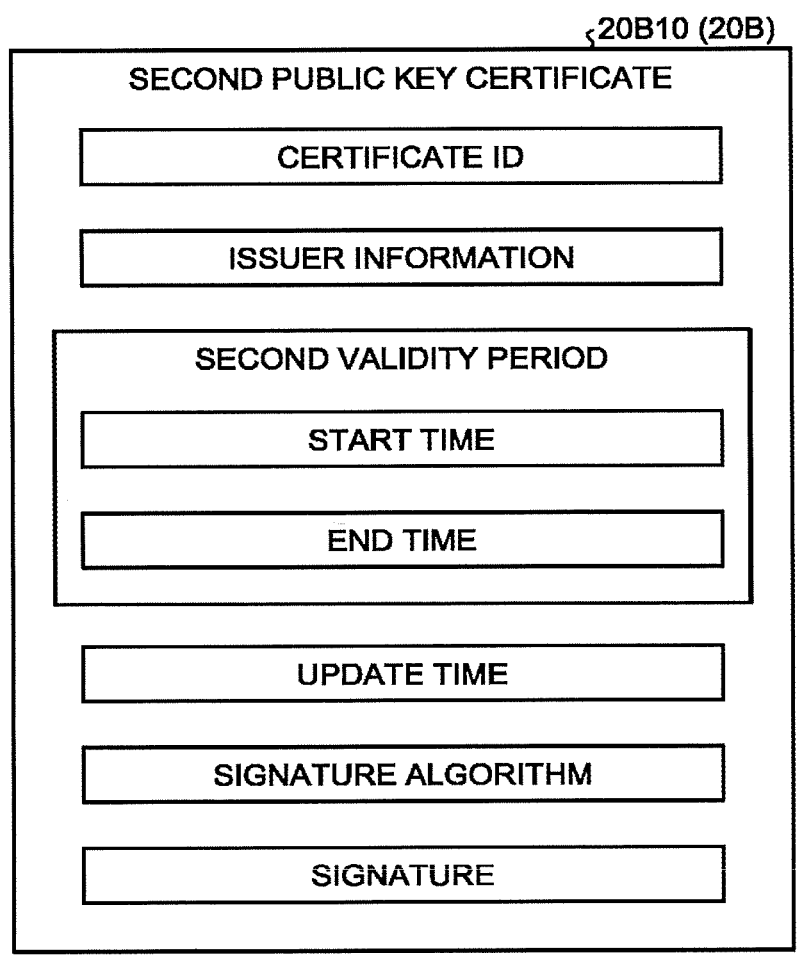
FIG. 11 is a schematic diagram of a data configuration of a second public key certificate.

FIG. 11 is a schematic diagram illustrating an example of a data configuration of the second public key certificate 20B10. The second public key certificate 20B10 is an example of the second public key certificate 20B.

As illustrated in FIG. 11, the second public key certificate 20B10 may include a certificate ID, issuer information, a second validity period (a start time and an end time), an update time, a signature algorithm, and a signature.

When the second public key certificate 20B has the data configuration illustrated in FIG. 11, it is possible to reduce a data amount of the second public key certificate 20B. Therefore, in the information processing system 1 of the present modified example, in addition to the effects of the above embodiment, it is possible to further reduce the load of the use entity of the public key certificate 20.

Second Modified Example

In the above embodiment, the mode in which, when an invalidation reason for invalidating the public key certificate 20 occurs, the updating unit 12B generates the second public key certificate 20B including the end time of the first validity period indicating the invalidation reason occurrence time or the end time of the second validity period indicating the invalidation reason occurrence time has been described. However, the updating unit 12B may generate the second public key certificate 20B including the invalidation reason occurrence time.

In other words, it is desirable for the updating unit 12B to generate the second public key certificate 20B including the invalidation reason occurrence time, the end time of the first validity period indicating the invalidation reason occurrence time, or the end time of the second validity period indicating the invalidation reason occurrence time.

Figure 12:
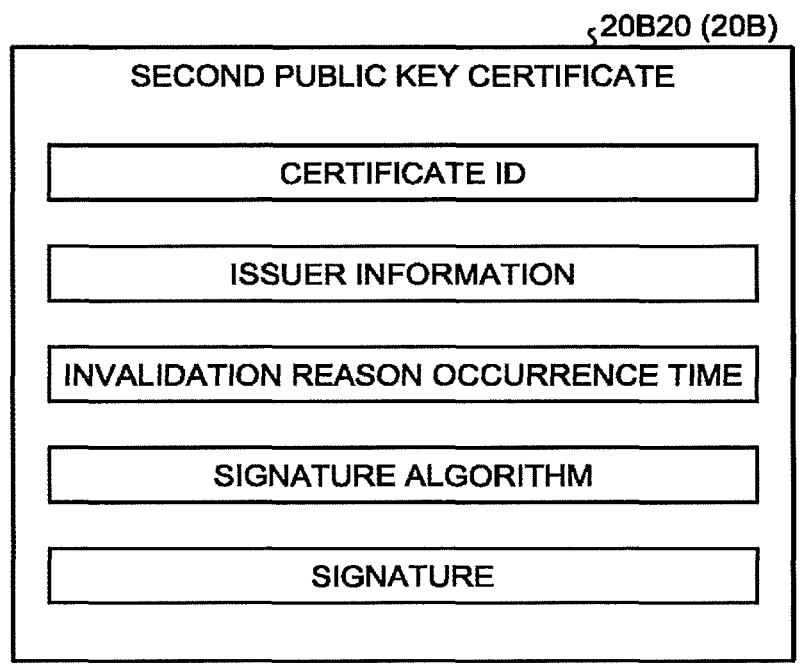
FIG. 12 is a schematic diagram of a data configuration of a second public key certificate.

FIG. 12 is a schematic diagram illustrating an example of a data configuration of the second public key certificate 20B20. The second public key certificate 20B20 is an example of the second public key certificate 20B including the invalidation reason occurrence time.

The second public key certificate 20B20 includes a certificate ID, issuer information, an invalidation reason occurrence time, a signature algorithm, and a signature.

As illustrated in FIG. 12, the updating unit 12B may generate the second public key certificate 20B20 illustrated in FIG. 12 when an invalidation reason occurs.

In this case, the communication device 14 (the HGW 16 and the device 18) using the second public key certificate 20B20 can confirm the invalidation of the second public key certificate 20B20 by confirming that the invalidation reason occurrence time included in the second public key certificate 20B20 is before the current time.

Further, it is possible to reduce the data amount of the second public key certificate 20B. Therefore, in the information processing system 1 of the present modified example, in addition to the effects of the above embodiment, it is possible to further reduce the load of the use entity of the public key certificate 20.

Third Modified Example

In the above embodiment, a case in which the HGW 16 is the authentication target of the public key certificate 20, and the device 18A is the use entity that verifies the public key certificate 20 has been described as an example.

However, the management server 12 and the information processing apparatus 10 of the above embodiment are also applicable even when the device 18 is the authentication target of the public key certificate 20, and the HGW 16 is the use entity that verifies the public key certificate 20.

Figure 13:
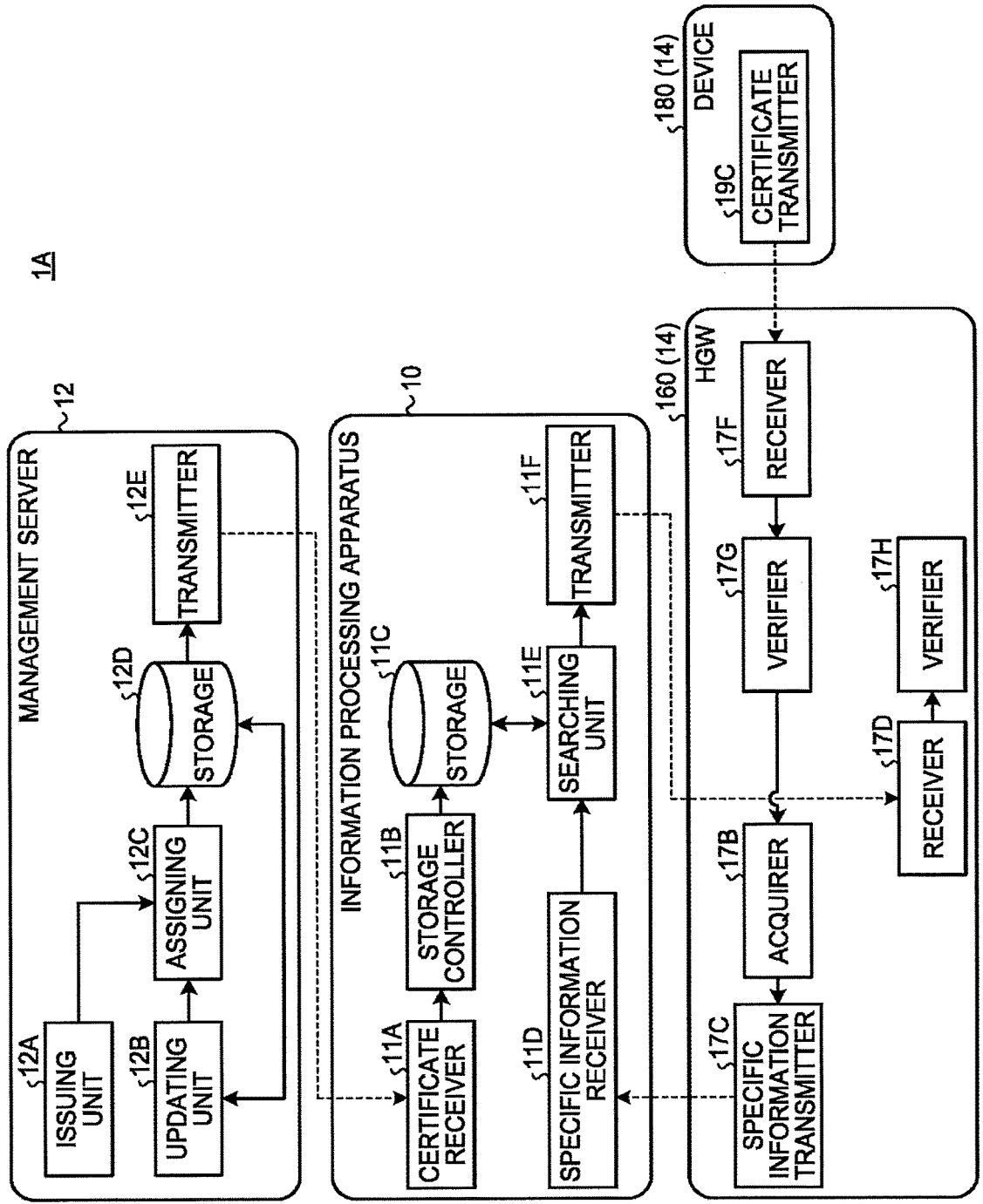
FIG. 13 is a functional block diagram of an information processing system.

FIG. 13 is a functional block diagram of an information processing system 1A of the present modified example. FIG. 13 is an example of a functional block diagram of the information processing system 1A when the information processing system 1A executes the process of Step S114 to Step S122 in FIG. 2.

The information processing system 1A includes a management server 12, an information processing apparatus 10, an HGW 160, and a device 180. The information processing system 1A is similar to the information processing system 1 of the above embodiment except that the HGW 160 is installed instead of the HGW 16, and the device 180 is installed instead of the device 18.

The device 180 includes a certificate transmitter 19C. The device 180 is similar to the device 18 except that the certificate transmitter 19C is installed instead of the certificate receiver 19A and the verifier 19B.

The certificate transmitter 19C transmits the public key certificate 20 (the first public key certificate 20A or the second public key certificate 20B) for certifying the device 180 to the HGW 160.

Then, the HGW 160 will be described. The HGW 160 includes an acquirer 17B, a specific information transmitter 17C, a receiver 17D, a verifier 17G, a verifier 17H, and a receiver 17F. The HGW 160B is similar to the HGW 16 except that the storage 17A and the transmitter 17E are not installed, and the receiver 17F, the verifier 17G, and the verifier 17H are further installed.

The receiver 17F receives the public key certificate 20 from the device 180. The verifier 17G verifies the signature of the public key certificate 20 received by the receiver 17F similarly to the above embodiment. Here, the description will be continued under the assumption that the verification result is successful.

The acquirer 17B acquires the specific information of the public key certificate 20 verified by the verifier 17G. In the present modified example, the acquirer 17B acquires the first public key certificate ID included in the public key certificate 20 verified by the verifier 17G as the specific information of the first public key certificate 20A for certifying the device 180.

The specific information transmitter 17C transmits the specific information acquired by the acquirer 17B to the information processing apparatus 10 similarly to the above embodiment.

The receiver 17D receives the second public key certificate 20B corresponding to the specific information transmitted by the specific information transmitter 17C from the information processing apparatus 10. The verifier 17H verifies the second public key certificate 20B received by the receiver 17D. It is desirable for the verifier 17H to verify the second public key certificate 20B similarly to the verifier 19B in the above embodiment.

As described above, in a case in which the device 180 is the authentication target of the public key certificate 20, and the HGW 160 is the use entity that verifies the public key certificate 20, the HGW 160 verifies the second public key certificate 20B. Therefore, the information processing apparatus 10 of the present modified example can reduce the load of the use entity of the public key certificate 20 similarly to the above embodiment.

Fourth Modified Example

The management server 12 and the information processing apparatus 10 of the above embodiment are applicable even when the device 18 already connected to the home network N3 is a use entity that verifies the public key certificate 20 of the device 18 newly connected to the home network N3.

Figure 14:
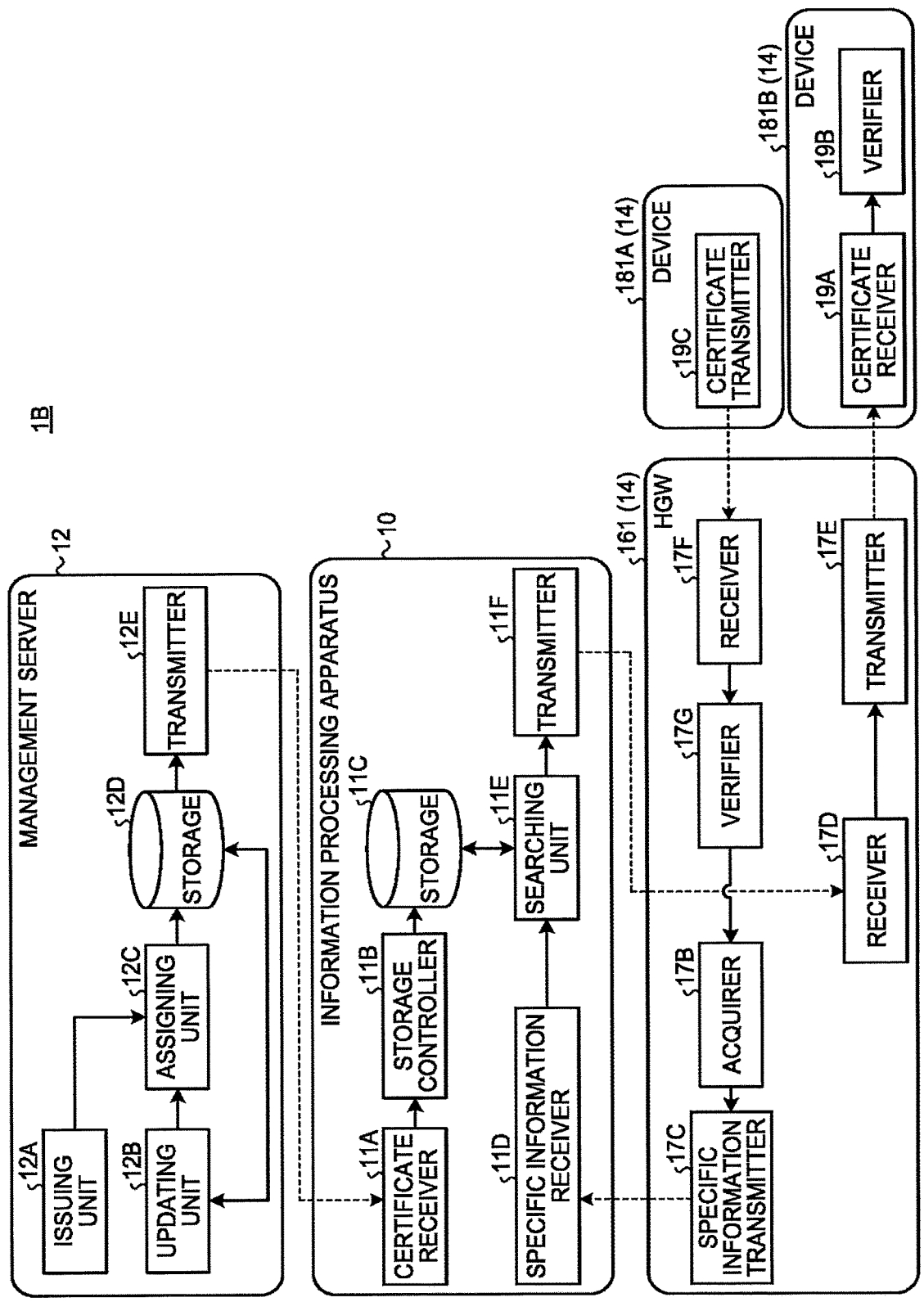
FIG. 14 is a functional block diagram of an information processing system.

FIG. 14 is a functional block diagram of an information processing system 1B of the present modified example. FIG. 14 is an example of a functional block diagram of the information processing system 1B when the information processing system 1B executes the process of Step S124 to Step S132 in FIG. 2.

The information processing system 1B includes a management server 12, an information processing apparatus 10, an HGW 161, a device 181A, and a device 181B. The information processing system 1B is similar to the information processing system 1 of the above embodiment except that the HGW 161 is installed instead of the HGW 16, and the device 181A and the device 181B are installed instead of the device 18.

The device 181A is a device 18 newly connected to the home network N3. The device 181B is a device 18 already connected to the home network N3.

The device 181A includes a certificate transmitter 19C. The device 181A is similar to the device 18 except that the certificate transmitter 19C is installed instead of the certificate receiver 19A and the verifier 19B.

The certificate transmitter 19C transmits the public key certificate 20 (the first public key certificate 20A or the second public key certificate 20B) for certifying the device 181A to the HGW 161.

Next, the HGW 161 will be described. The HGW 161 includes an acquirer 17B, a specific information transmitter 17C, a receiver 17D, a transmitter 17E, a verifier 17H, and a receiver 17F. The HGW 161 is similar to the HGW 16 except that the storage 17A is not installed, and the receiver 17F and the verifier 17G are further installed.

The receiver 17F receives the public key certificate 20 from the device 181A. The verifier 17G verifies the signature of the public key certificate 20 received by the receiver 17F similarly to the above embodiment. Here, the description will be continued under the assumption that the verification result is successful.

The acquirer 17B acquires the specific information of the public key certificate 20 verified by the receiver 17F. In the present modified example, the acquirer 17B acquires the first public key certificate ID included in the public key certificate 20 verified by the verifier 17G as the specific information of the first public key certificate 20A for certifying the device 181A.

The specific information transmitter 17C transmits the specific information acquired by the acquirer 17B to the information processing apparatus 10 similarly to the above embodiment.

The receiver 17D receives the second public key certificate 20B corresponding to the specific information transmitted by the specific information transmitter 17C from the information processing apparatus 10. The transmitter 17E transmits the second public key certificate 20B received by the receiver 17D to the device 181B.

The device 181B includes a certificate receiver 19A and a verifier 19B. The certificate receiver 19A receives the second public key certificate 20B from the HGW 161. The verifier 19B verifies the second public key certificate 20B received by the certificate receiver 19A similarly to the above embodiment.

As described above, when the device 181A newly connected to the home network N3 is the authentication target of the public key certificate 20, and the device 181B already connected to the home network N3 is the use entity that verifies the public key certificate 20, the device 181B verifies the second public key certificate 20B.

Therefore, the information processing apparatus 10 of the present modified example can reduce the load of the use entity of the public key certificate 20 similarly to the above embodiment.

Figure 15:
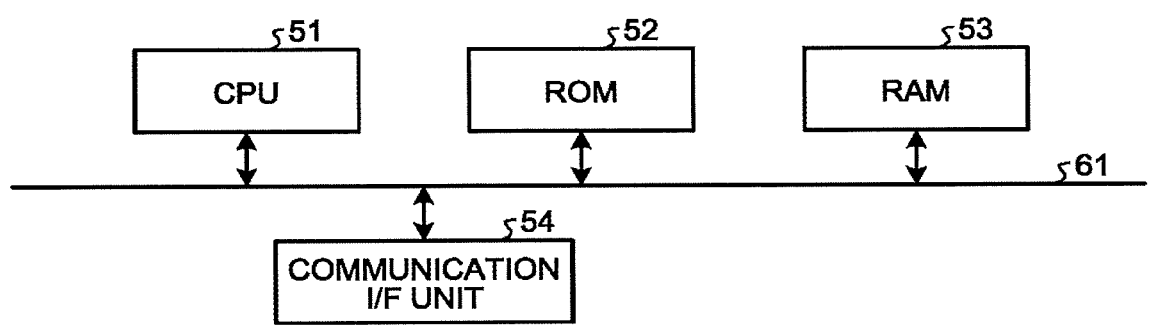
FIG. 15 is a hardware configuration diagram.

Then, an example of hardware configurations of the information processing apparatus 10, the management server 12, the communication device 14, the HGWs 16, 160, and 161, the devices 18, 180, 181A, and 181B of the embodiment and the modified examples will be described. FIG. 15 is an example of a hardware configuration diagram of the information processing apparatus 10, the management server 12, the communication device 14, the HGWs 16, 160, and 161, the devices 18, 180, 181A, and 181B of the above embodiment and the modified examples.

Each of the information processing apparatus 10, the management server 12, the communication device 14, the HGWs 16, 160, and 161, and the devices 18, 180, 181A, and 181B of the above embodiment and the modified examples includes a control apparatus such as a central processing unit (CPU) 51, a storage apparatus such as a read only memory (ROM) 52, a random access memory (RAM) 53, or a hard disk drive (HDD), a communication I/F unit 54 that is an interface with various types of devices, and a bus 61 connecting the respective units, and has a hardware configuration using a common computer.

In the information processing apparatus 10, the management server 12, the communication device 14, the HGWs 16, 160, and 161, the devices 18, 180, 181A, and 181B of the above embodiment and the modified examples, when the CPU 51 reads a program from the ROM 52 onto the RAM 53 and executes the program, the above-described respective functions are realized on the computer.

Further, the program for executing the above-described processes executed by the information processing apparatus 10, the management server 12, the communication device 14, the HGWs 16, 160, and 161, and the devices 18, 180, 181A, and 181B may be stored in the HDD. Further, the program for executing the above-described processes executed by the information processing apparatus 10, the management server 12, the communication device 14, the HGWs 16, 160, and 161, the devices 18, 180, 181A, and 181B may be provided in a form in which it is embedded in the ROM 52 in advance.

Further, the program for executing the above-described processes executed by the information processing apparatus 10, the management server 12, the communication device 14, the HGWs 16, 160, and 161, the devices 18, 180, 181A, and 181B may be provided as a computer program product in a form in which it is stored in a computer readable storage medium such as a CD-ROM, a CD-R, a memory card, a digital versatile disk (DVD), or a flexible disk (FD) in a file having an installable format or an executable format. Further, the program for executing the above-described processes executed by the information processing apparatus 10, the management server 12, the communication device 14, the HGWs 16, 160, and 161, the devices 18, 180, 181A, and 181B may be stored in a computer connected to a network such as the Internet and provided by downloading via a network. Further, the program for executing the above-described processes executed by the information processing apparatus 10, the management server 12, the communication device 14, the HGWs 16, 160, and 161, the devices 18, 180, 181A, and 181B may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
processing circuitry configured to
store a first public key certificate and a plurality of second public key certificates in a memory, the first public key certificate including at least a first validity period, a signature, and a public key, the plurality of second public key certificates being generated by updating the first public key certificate, each of the plurality of second public key certificates including at least a signature and a second validity period that is within the first validity period and shorter than the first validity period, wherein a plurality of second validity periods included in the plurality of second public key certificates are mutually different;
receive specific information of the first public key certificate; and
transmit, to a transmission source of the specific information, a particular second public key certificate of the plurality of second public key certificates that includes the second validity period in which a start time of the second validity period is before a current time and generated from the first public key certificate specified by the received specific information,
wherein when an invalidation reason occurs, the particular second public key certificate, generated from the first public key certificate at or after an invalidation reason occurrence time, includes the invalidation reason occurrence time or end time of the second validity period indicating the invalidation reason occurrence time.

2. The information processing apparatus according to claim 1, wherein the processing circuitry is further configured to store, in the memory, the first public key certificate and the particular second public key certificate, which are received from a management server that generates the first public key certificate and the second public key certificate.

3. The information processing apparatus according to claim 1, wherein the processing circuitry is further configured to transmit, to the transmission source, the particular second public key certificate, in which the start time of the second validity period is before the current time, and the end time of the second validity period is latest among the plurality of second public key certificates generated from the first public key certificate specified by the received specific information.

4. The information processing apparatus according to claim 1, wherein the plurality of second public key certificates stored in the memory and generated from the first public key certificate are mutually different in at least one of the start time of the second validity period and the end time of the second validity period.

5. The information processing apparatus according to claim 1, wherein at least one of the second public key certificates stored in the memory further includes a next update time of the first public key certificate.

6. An information processing system, comprising:
an information processing apparatus; and
a communication device configured to perform communication with the information processing apparatus,
the information processing apparatus comprising first processing circuitry configured to:

store a first public key certificate and a plurality of second public key certificates in a memory, the first public key certificate including at least a first validity period, a signature, and a public key, the plurality of second public key certificates being generated by updating the first public key certificate, each of the plurality of second public key certificates including at least a signature and a second validity period that is within the first validity period and shorter than the first validity period, wherein a plurality of second validity periods included in the plurality of second public key certificates are mutually different;

receive specific information of the first public key certificate; and transmit, to a transmission source of the specific information, a particular second public key certificate of the plurality of second public key certificates that includes the second validity period in which a start time of the second validity period is before a current time and generated from the first public key certificate specified by the received specific information, the communication device comprising second processing circuitry configured to:

receive the particular second public key certificate; and verify that the particular second public key certificate is valid when a current time is included in the second validity period included in the second public key certificate, wherein when an invalidation reason occurs, the particular second public key certificate, generated from the first public key certificate at or after an invalidation reason occurrence time, includes the invalidation reason occurrence time or an end time of the second validity period indicating the invalidation reason occurrence time.

7. The information processing apparatus according to claim 1, wherein when the invalidation reason occurs, a previous second public key certificate generated last time is set to include the end time of the second validity period of the particular second public key certificate newly generated after the invalidation reason occurs.

8. The information processing apparatus of claim 1, wherein the particular second public key certificate includes the end time of the second validity period indicating the invalidation reason occurrence time, the invalidation reason being other than an ending of the second validity period.

* * * * *